(12) United States Patent
Youn et al.

(10) Patent No.: US 11,246,172 B2
(45) Date of Patent: Feb. 8, 2022

(54) METHOD FOR SELECTING SESSION AND SERVICE CONTINUITY MODE IN WIRELESS COMMUNICATION SYSTEM AND DEVICE THEREFOR

(71) Applicant: LG Electronics Inc., Seoul (KR)

(72) Inventors: Myungjune Youn, Seoul (KR); Hyunsook Kim, Seoul (KR); Jinsook Ryu, Seoul (KR)

(73) Assignee: LG Electronics Inc., Seoul (KR)

(*) Notice: Subject to any disclaimer, the term of this patent is extended or adjusted under 35 U.S.C. 154(b) by 207 days.

(21) Appl. No.: 16/339,918

(22) PCT Filed: Aug. 3, 2017

(86) PCT No.: PCT/KR2017/008381
§ 371 (c)(1),
(2) Date: Apr. 5, 2019

(87) PCT Pub. No.: WO2018/066799
PCT Pub. Date: Apr. 12, 2018

(65) Prior Publication Data
US 2020/0053803 A1 Feb. 13, 2020

Related U.S. Application Data

(60) Provisional application No. 62/405,259, filed on Oct. 7, 2016.

(51) Int. Cl.
*H04W 76/10* (2018.01)
*H04L 29/08* (2006.01)
(Continued)

(52) U.S. Cl.
CPC ............ *H04W 76/10* (2018.02); *H04L 47/19* (2013.01); *H04L 67/141* (2013.01); *H04L 67/148* (2013.01); *H04W 80/10* (2013.01)

(58) Field of Classification Search
CPC ..... H04L 67/14; H04L 67/141; H04L 67/148; H04L 47/19
See application file for complete search history.

(56) References Cited

U.S. PATENT DOCUMENTS 10,841,829 B2 * 11/2020 Maeder ................ H04W 76/20
2012/0155457 A1 6/2012 Yi et al.
(Continued)

FOREIGN PATENT DOCUMENTS

WO WO2015170862 11/2015

OTHER PUBLICATIONS

3GPP TR 23.799 V0.8.0 (Sep. 2016)—3rd Generaton Partnership Project—pp. 312-327 (Year: 2016).*

*Primary Examiner* — Redentor Pasia
(74) *Attorney, Agent, or Firm* — Fish & Richardson P.C.

(57) ABSTRACT

Disclosed are a method for selecting a session and a service continuity mode in a wireless communication system and a device therefor. Specifically, a method for selecting a session-and-service continuity (SSC) mode associated with a protocol data unit (PDU) session by a user equipment (UE) in a wireless communication system supporting a plurality of SSC modes may comprise the steps of: receiving a data transmission request from an application; checking whether a first PDU session can support an SSC mode associated with the application; and when the first PDU session can support the SSC mode associated with the application, transmitting data of the application to a network by using the first PDU session without sending a request for establishment of a new second PDU session to the network, although an SSC mode of the first PDU session does not match the SSC mode associated with the application.

11 Claims, 14 Drawing Sheets

(51) Int. Cl.
*H04L 12/801* (2013.01)
*H04W 80/10* (2009.01)

(56) References Cited

U.S. PATENT DOCUMENTS

| | | |
|---|---|---|
| 2014/0362822 A1 | 12/2014 | Tseng et al. |
| 2015/0271274 A1 | 9/2015 | Kim et al. |
| 2016/0142900 A1 | 5/2016 | Sandhu et al. |
| 2017/0366399 A1* | 12/2017 | Li .................... H04L 41/0816 |
| 2018/0097894 A1* | 4/2018 | Li ...................... H04L 67/141 |
| 2019/0150219 A1* | 5/2019 | Wang ................ H04W 76/30 370/329 |
| 2019/0182895 A1* | 6/2019 | Di Girolamo .... H04W 36/0033 |

* cited by examiner

METHOD FOR SELECTING SESSION AND SERVICE CONTINUITY MODE IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2017/008381, filed on Aug. 3, 2017, which claims the benefit of U.S. Provisional Application No. 62/405,259, filed on Oct. 7, 2016. The disclosures of the prior applications are incorporated by reference in their entirety.

BACKGROUND OF THE INVENTION

Field of the invention

The present invention relates to a wireless communication system and, more particularly, to a method of selecting (or supporting the selection of) a session and service continuity mode associated with a protocol data unit in a wireless communication system supporting a plurality of session and service continuity modes and an apparatus supporting the same.

Related Art

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY OF THE INVENTION

The present invention proposes a method of selecting or supporting the selection of a session and service continuity mode associated with a protocol data unit.

Furthermore, the present invention proposes a method using the existing protocol data unit session in order to transmit the data of an application by taking into consideration the characteristics of a session and service continuity mode.

The technical objects of the present invention are not limited to the aforementioned technical objects, and other technical objects, which are not mentioned above, will be apparently appreciated by a person having ordinary skill in the art from the following description.

In an aspect, a method of selecting a session and service continuity (SSC) mode, associated with a protocol data unit (PDU) session, by a user equipment (UE) among a plurality of SSC modes in a wireless communication system supporting may include receiving a request for data transmission from an application, checking whether a first PDU session is capable of supporting the SSC mode associated with the application, and if the first PDU session is capable of supporting the SSC mode associated with the application, transmitting the data of the application to a network using the first PDU session without requesting the network to establish a new second PDU session although an SSC mode of the first PDU session is not identical with the SSC mode associated with the application.

Preferably, the SSC mode may include an SSC mode 1, an SSC mode 2 and an SSC mode 3. In the PDU session of the SSC mode 1, a PDU session anchor used when a PDU session is established may be maintained regardless of an access technology that is being used for the UE to access the network. In the PDU session of the SSC mode 2, to maintain a PDU session anchor used when a PDU session is established may not be guaranteed. In the PDU session of the SSC mode 3, the establishment of UE connectivity through a new PDU session anchor to the same data network before a connection between the UE and a previous PDU session anchor may be allowed.

Preferably, the method may further include receiving an accepted SSC mode and allowed SSC mode for the first PDU session from the network when the first PDU session is established.

Preferably, the checking step may include checking whether the SSC mode associated with the application is included in the allowed SSC mode.

Preferably, the checking step may include checking whether the first PDU session is capable of supporting the SSC mode associated with the application based on a policy provided by the network.

Preferably, the checking step may include checking whether the SSC mode of the first PDU session supports a higher session and service continuity than the SSC mode associated with the application.

Preferably, when the SSC mode of the first PDU session is the SSC mode 1, the first PDU session may support all cases where the SSC mode associated with the application is the SSC mode 1, the SSC mode 2 or the SSC mode 3.

Preferably, when the SSC mode of the first PDU session is the SSC mode 2, the first PDU session may support only a case where the SSC mode associated with the application is the SSC mode 2.

Preferably, when the SSC mode of the first PDU session is the SSC mode 3, the first PDU session may support a case where the SSC mode associated with the application is the SSC mode 2 or the SSC mode 3.

Preferably, when the request for data transmission is received from the application, an SSC mode requested by the application may be indicated together.

Preferably, the method may further include determining an SSC mode, associated with the application, based on a policy provided by the network if an SSC mode requested by the application is not indicated when the request for data transmission is received from the application.

In another aspect, a method of supporting a selection of session and service continuity (SSC), associated with a protocol data unit (PDU), by a network in a wireless communication system supporting a plurality of SSC modes may include receiving a PDU session establishment request message from a user equipment (UE), wherein the PDU session establishment request message includes an SSC mode requested for the PDU session, selecting an SSC mode for the PDU session by accepting the requested SSC mode or modifying the requested SSC mode based on subscription information and/or a local configuration, and transmitting a PDU session establishment accept message to the UE, wherein the PDU session establishment accept message includes the selected SSC mode and an allowed SSC mode indicating an SSC mode capable of being supported by the PDU session other than the selected SSC mode.

According to an embodiment of the present invention, a resource and signaling load can be reduced both in a UE and a network because an unnecessary protocol data unit session is not established.

According to an embodiment of the present invention, the existing protocol data unit session can be reused based on the session and service continuity of the existing activated protocol data unit and a session and service continuity mode associated with an application.

Effects which may be obtained in the present invention are not limited to the above-described effects, and other technical effects not described above may be evidently understood by a person having ordinary skill in the art to which the present invention pertains from the following description.

BRIEF DESCRIPTION OF THE DRAWINGS

The accompanying drawings, included as part of the detailed description in order to help understanding of the present invention, provide embodiments of the present invention and describe the technical characteristics of the present invention along with the detailed description.

DESCRIPTION OF EXEMPLARY EMBODIMENTS

Figure 1:
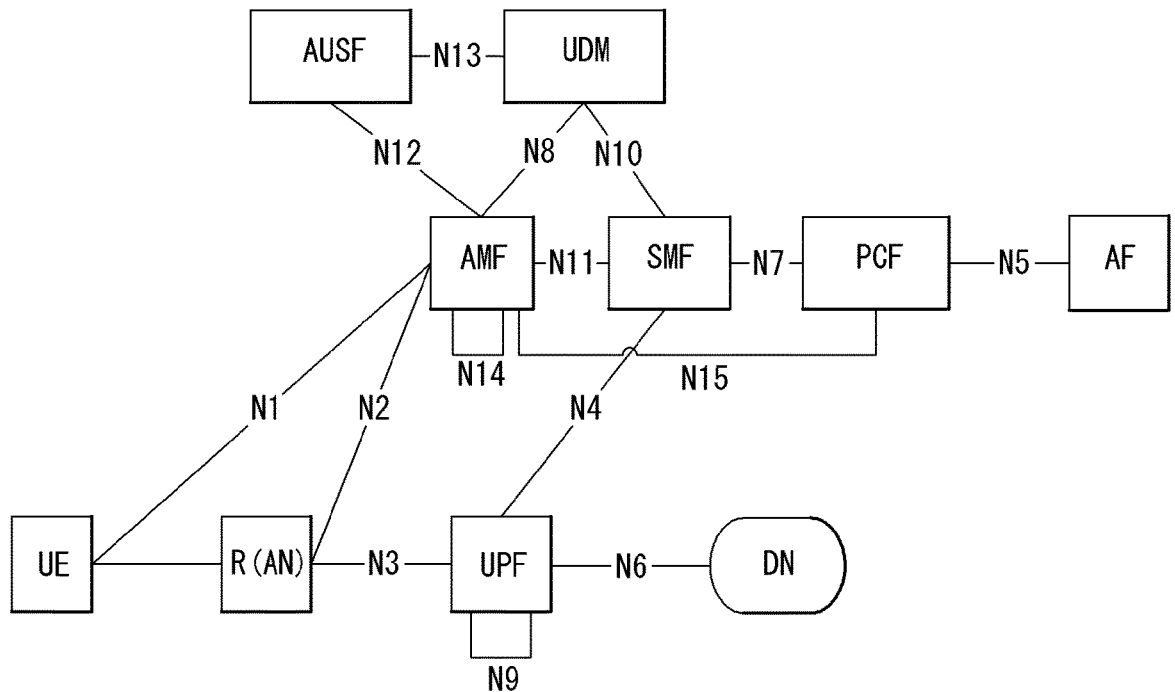
FIG. 1 illustrates a 5G system architecture using a reference point expression to which the present invention may be applied.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP 5G (5 Generation) system, but the technical features of the present invention are not limited to the current descriptions.

Terms used in this document are defined as follows.

Evolved Packet System (EPS): a network system including an Evolved Packet Core (EPC), that is an Internet Protocol (IP) based packet switched core network, and an access network such as LTE and UTRAN. The EPS is a network of an evolved version of a Universal Mobile Telecommunications System (UMTS).

eNodeB: a base station of an EPS network. The eNodeB is installed outdoor, and its coverage has a scale of a macro cell.

International Mobile Subscriber Identity (IMSI): an internationally unique subscriber identity allocated in a mobile communication network.

Public Land Mobile Network (PLMN): a network configured for the purpose of providing mobile communication services to individuals. The PLMN can be configured for each operator.

5G system (5GS): a system composed of a 5G Access Network (AN), a 5G core network and a User Equipment (UE).

5G Access Network (5G-AN) (or AN): an access network composed of a New Generation Radio Access Network (NG-RAN) and/or a non-3GPP Access Network (AN) connected to the 5G core network.

New Generation Radio Access Network (NG-RAN) (or RAN): a Radio Access Network having a common feature of being connected to 5GC and supporting one or more of the following options:

1) Standalone New Radio.
2) New radio that is an anchor supporting E-UTRA extension.
3) Standalone E-UTRA (for example, eNodeB).
4) Anchor supporting new radio extension 5G Core Network (5GC): a core network connected to a 5G access network.

Network Function (NF): means a processing function adopted in 3GPP within a network or defined in 3GPP. The processing function includes a defined functional behavior and an interface defined in 3GPP.

NF service: a function exposed by the NF via a service-based interface and consumed by other authenticated NF(s).

Network Slice: a logical network that provides specific network capability(s) and network feature(s).

Network Slice instance: a set of NF instance(s) and required resources(s) (e.g., compute, storage, and networking resources) that form a deployed network slice.

Protocol Data Unit (PDU) Connectivity Service: service providing the exchange of PDU(s) between the UE and a data network.

PDU Connectivity Service: service providing the exchange of PDU(s) between the UE and a data network.

PDU Session: association between the UE and the data network providing the PDU Connectivity Service. An association type may be Internet Protocol (IP), Ethernet, or unstructured.

Non-Access Stratum (NAS): a functional layer for transceiving signaling and a traffic message between the UE and the core network in EPS and 5GS protocol stack. The NAS mainly functions to support mobility of the UE and support a session management procedure.

5G system architecture to which the present invention is applicable

A 5G system is an advanced technology from 4G LTE mobile communication technology and supports a new Radio Access Technology (RAT), extended Long Term Evolution (eLTE) as an extended technology of LTE, non-3GPP access (e.g., Wireless Local Area Network (WLAN) access), etc. through the evolution of an existing mobile communication network structure or a Clean-state structure.

The 5G system is defined based on a service, and an interaction between Network Functions (NFs) in an architecture for the 5G system can be represented in two ways as follows.

Reference point representation (see FIG. 1): indicates an interaction between NF services in NFs described by a point-to-point reference point (e.g., N11) between two NFs (e.g. AMF and SMF).

Service-based representation (see FIG. 2): network functions (e.g., AMF) within a Control Plane (CP) allow other authenticated network functions to access its services. The representation also includes a point-to-point reference point, if necessary.

FIG. 1 illustrates a 5G system architecture using reference point representation to which the present invention is applicable.

Referring to FIG. 1, a 5G system architecture may include various components (i.e., network functions (NFs)). FIG. 1 illustrates some of the various components including an Authentication Server Function (AUSF), a (Core) Access and Mobility Management Function (AMF), a Session Management Function (SMF), a Policy Control function (PCF), an Application Function (AF), a Unified Data Management (UDM), Data network (DN), User plane Function (UPF), a (Radio) Access Network ((R)AN), and a User Equipment (UE).

Respective NFs support the following functions.

The AUSF stores data for the authentication of the UE.

The AMF provides a function for the connection and mobility management for each UE, and one AMF can be basically connected to one UE.

More specifically, the AMF supports functions of inter-CN node signaling for mobility between 3GPP access networks, termination of RAN CP interface (i.e., N2 interface), termination N1 of NAS signaling, NAS signaling security (NAS ciphering and integrity protection), AS security control, registration management (registration area management), connection management, idle mode UE reachability (including control and execution of paging retransmission), mobility management control (subscription and policy), support of intra-system mobility and inter-system mobility, support of network slicing, SMF selection, lawful intercept (for an interface to AMF event and L1 system), providing the delivery of a session management (SM) message between UE and SMF, transparent proxy for routing the SM message, access authentication, access authorization including roaming authority check, providing the delivery of a SMS message between UE and SMSF, Security Anchor Function (SEA), Security Context Management (SCM), and the like.

Some or all of the functions of the AMF can be supported in a single instance of one AMF.

The DN means, for example, operator services, internet access, or 3rd party service. The DN transmits a downlink Protocol Data Unit (PDU) to the UPF or receives the PDU transmitted from the UE from the UPF.

The PCF receives information about packet flow from an application server and provides functions of determining policies such as mobility management and session management. More specifically, the PCF supports functions of supporting a unified policy framework for controlling a network operation, providing a policy rule so that CP function(s) (e.g., AMF, SMF, etc.) can enforce the policy rule, and implementing a front end for accessing related subscription information for policy decision in a User Data Repository (UDR).

The SMF provides a session management function. If the UE has a plurality of sessions, the sessions can be respectively managed by different SMFs.

More specifically, the SMF supports functions of session management (e.g., session establishment, modification, and release, including tunnel maintenance between the UPF and the AN node), UE IP address allocation and management (including optional authentication), selection and control of UP function, configuring traffic steering at UPF to route traffic to proper destination, termination of interfaces toward policy control functions, enforcement of control part of a policy and QoS, lawful intercept (for an interface to SM event and L1 system), termination of SM part of a NAS message, downlink data notification, an initiator of AN specific SM information (sent to AN via the AMF over N2), SSC mode decision of the session, a roaming function, and the like.

Some or all of the functions of the SMF can be supported in a single instance of one SMF.

The UDM stores subscription data of user, policy data, etc. The UDM includes two parts, i.e., application front end (FE) and User Data Repository (UDR).

The FE includes UDM FE taking charge of location management, subscription management, processing of credential, etc. and PCF taking charge of policy control. The UDR stores data required for functions provided by the UDM-FE and a policy profile required by the PCF. Data stored in the UDR includes user subscription data including subscription identifier, security credential, access and mobility related subscription data, and session related subscription data and policy data. The UDM-FE accesses subscription information stored in the UDR and supports functions of Authentication Credential Processing, User Identification Handling, access authentication, registration/mobility management, subscription management, SMS management, and the like.

The UPF transmits the downlink PDU received from the DN to the UE via the (R)AN and transmits the uplink PDU received from the UE to the DN via the (R)AN.

More specifically, the UPF supports functions of anchor point for intra/inter RAT mobility, external PDU session point of interconnect to Data Network (DN), packet routing and forwarding, packet inspection and user plane part of policy rule enforcement, lawful intercept, reporting of traffic usage, uplink classifier to support routing traffic flow to Data Network (DN), branching point to support multi-homed PDU session, QoS handling (e.g., packet filtering, gating, uplink/downlink rate enforcement) for user plane, uplink traffic verification (SDF mapping between Service Data Flow (SDF) and QoS flow), transport level packet marking in the uplink and downlink, downlink packet buffering and downlink data notification triggering, and the like. Some or all of the functions of the UPF can be supported in a single instance of one UPF.

AF interacts with 3GPP core network to provide services (e.g., support functions of an application influence on traffic routing, network capability exposure access, interaction with policy framework for policy control, and the like).

(R)AN collectively refers to a new radio access network supporting both evolved E-UTRA, that is an evolved version of 4G radio access technology, and a New Radio (NR) access technology (e.g., gNB).

A gNB supports functions of radio resource management function (i.e., radio bearer control, radio admission control, connection mobility control, dynamic allocation of resources to the UE in uplink/downlink (scheduling)), Internet Protocol (IP) header compression, encryption of user data stream and integrity protection, selection of AMF upon attachment of the UE if routing to the AMF is not determined from information provided to the UE, routing of user plane data to UPF(s), routing of control plane information to ANF, connection setup and release, scheduling and transmission of a paging message (generated from the AMF), scheduling and transmission of system broadcast information (generated from the AMF or operating and maintenance (O&M)), measurement and measurement reporting configuration for mobility and scheduling, transport level packet marking in uplink, session management, support of network slicing, QoS flow management and mapping to data radio bearer, support of a UE in an inactive mode, NAS message distribution function, NAS node selection function, radio access network sharing, dual connectivity, tight interworking between NR and E-UTRA, and the like.

The UE means a user equipment. The user equipment may be referred to as a term such as a terminal, a mobile equipment (ME), and a mobile station (MS). The user equipment may be a portable device such as a notebook computer, a cellular phone, a personal digital assistant (PDA), a smart phone, and a multimedia device, or a non-portable device such as a personal computer (PC) and a vehicle-mounted device.

Although Unstructured Data Storage network Function (UDSF), Structured Data Storage network Function (SDSF), Network Exposure Function (NEF), and NF Repository Function (NRF) are not shown in FIG. 1 for clarity of explanation, all the NFs shown in FIG. 1 can perform interaction with the UDSF, the NEF and the NRF, if necessary.

The NEF provides a means to securely expose services and capabilities provided by 3GPP network functions, for example, 3rd party, internal exposure/re-exposure, application function, and edge computing. The NEF receives information from other network function(s) (based on exposed capabilities of other network function(s)). The NEF can store the received information as structured data using a standardized interface to a data storage network function. The stored information can be re-exposed by the NEF to other network functions and other application functions and can be used for other purposes such as analytics.

The NRF supports a service discovery function. The NRF receives NF Discovery Request from NF instance and provides information of the discovered NF instance to the NF instance. The NRF also maintains available NF instances and their supported services.

The SDSF is structured data by any NEF and is a selective function to support a storage and retrieval function of information.

The UDSF is unstructured data by any NF and is a selective function to support a storage and retrieval function of information.

FIG. 1 illustrates a reference model where the UE accesses one DN using one PDU session, for convenience of explanation. However, the present invention is not limited thereto.

The UE can simultaneously access two (i.e., local and central) data networks using multiple PDU sessions. In this instance, two SMFs may be selected for different PDU sessions. Each SMF may have a capability capable of controlling both local UPF and central UPF within the PDU session.

Further, the UE can simultaneously access two (i.e., local and central) data networks provided within a single PDU session.

In the 3GPP system, a conceptual link connecting between the NFs in the 5G system is defined as a reference point. The following illustrates reference points included in the 5G system architecture as represented in FIG. 1.

N1: Reference point between the UE and the AMF
N2: Reference point between the (R)AN and the AMF
N3: Reference point between the (R)AN and the UPF
N4: Reference point between the SMF and the UPF
N5: Reference point between the PCF and the AF
N6: Reference point between the UPF and the data network
N7: Reference point between the SMF and the PCF
N24: Reference point between the PCF in the visited network and the PCF in the home network
N8: Reference point between the UDM and the AMF
N9: Reference point between two core UPFs
N10: Reference point between the UDM and the SMF
N11: Reference point between the AMF and the SMF
N12: Reference point between the AMF and the AUSF
N13: Reference point between UDM and Authentication Server function (AUSF)
N14: Reference point between two AMFs
N15: Reference point between the PCF and the AMF in case of non-roaming scenario, reference point between the PCF in the visited network and the AMF in case of roaming scenario
N16: Reference point between two SMFs (reference point between the SMF in the visited network and the SMF in the home network in case of roaming scenario)
N17: Reference point between AMF and EIR
N18: Reference point between any NF and UDSF
N19: Reference point between the NEF and the SDSF FIG. 2 illustrates a 5G system architecture to which the present invention is applicable.

Figure 2:
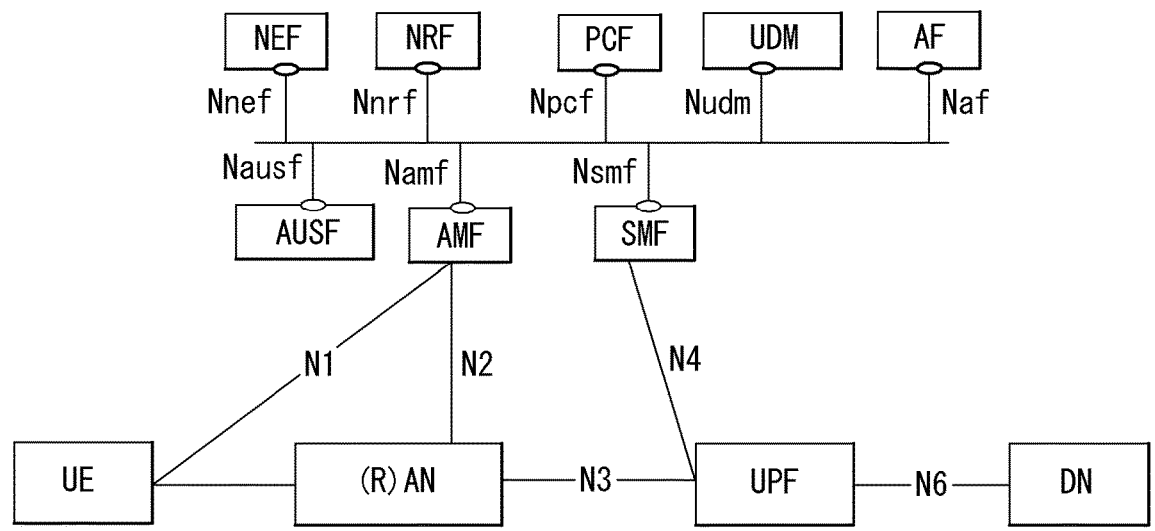
FIG. 2 illustrates a 5G system architecture to which the present invention may be applied.

Service-based interfaces illustrated in FIG. 2 indicate a set of services provided/exposed by a predetermined NF. The service-based interfaces are used in control plane. The following illustrates the service-based interfaces included in the 5G system architecture as represented in FIG. 1.

Namf: Service-based interface exhibited by the AMF
Nsmf: Service-based interface exhibited by the SMF
Nnef: Service-based interface exhibited by the NEF
Npcf: Service-based interface exhibited by the PCF
Nudm: Service-based interface exhibited by the UDM
Naf: Service-based interface exhibited by the AF
Nnrf: Service-based interface exhibited by the NRF
Nausf: Service-based interface exhibited by the AUSF The NF service is one type of capability exposed by an NF (i.e., NF service producer) to other NF (i.e., NF service consumer) via the service-based interface. The NF can expose one or more NF service(s). The following standard is applied to define the NF service.

The NF services are derived from information flow for explaining an end-to-end function.

Complete end-to-end message flow is explained by a sequence of NF service invocation.

Two operations that the NF(s) provide its services via the service-based interface are as follows:

i) "Request-response": A control plane NF_B (i.e., NF service producer) is requested from another control plane NF_A (i.e., NF service consumer) to provide a certain NF service (including performing an operation and/or providing information). The NF_B responses NF service result based on information provided by the NF_A in the Request.

In order to fulfil the request, the NF_B may in turn consume NF services from other NF(s). In Request-response mechanism, communication is performed one to one between two NFs (i.e., consumer and producer).

ii) "Subscribe-Notify"

A control plane NF_A (i.e., NF service consumer) subscribes to a NF service provided by another control plane NF_B (i.e., NF service producer). Multiple control plane NFs may subscribe to the same control plane NF service. The NF_B notifies a result of this NF service to the interested NFs that are subscribed to this NF service. A subscription request from the consumer may include a notification request for periodic update or notification triggered through specific events (e.g., change of requested information, reaching a certain critical value, etc.). This mechanism also includes the case where the NF(s) (e.g., NF_B) implicitly subscribes to a specific notice without an explicit subscription request (e.g., the case where the NF(s) subscribes through a successful registration procedure).

Figure 3:
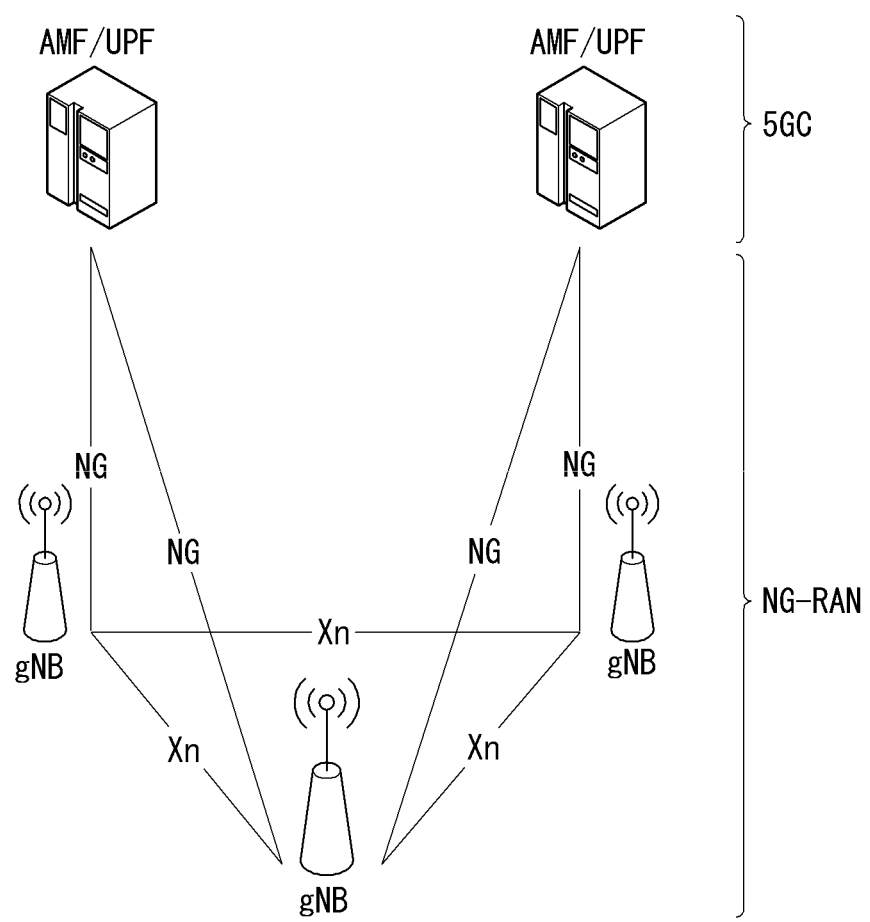
FIG. 3 illustrates an NG-RAN architecture to which the present invention may be applied.

FIG. 3 illustrates an NG-RAN architecture to which the present invention is applicable.

Referring to FIG. 3, a New Generation Radio Access Network (NG-RAN) includes gNB (NR NodeB)(s) and/or eNB (eNodeB)(s) providing a user plane toward a UE and termination of control plane protocol, The gNB(s) are interconnected using an Xn interface, and the eNB(s) connected to the gNB(s) and 5GC are also interconnected using the Xn interface. The gNB(s) and the eNB(s) are connected to the 5GC using an NG interface. More specifically, the gNB(s) and the eNB(s) are connected to the AMF using an NG-C interface (i.e., N2 reference point) that is a control plane interface between the NG-RAN the 5GC, and are connected to the UPF using an NG-U interface (i.e., N3 reference point) that is a user plane interface between the NG-RAN and the 5GC.

Figure 4:
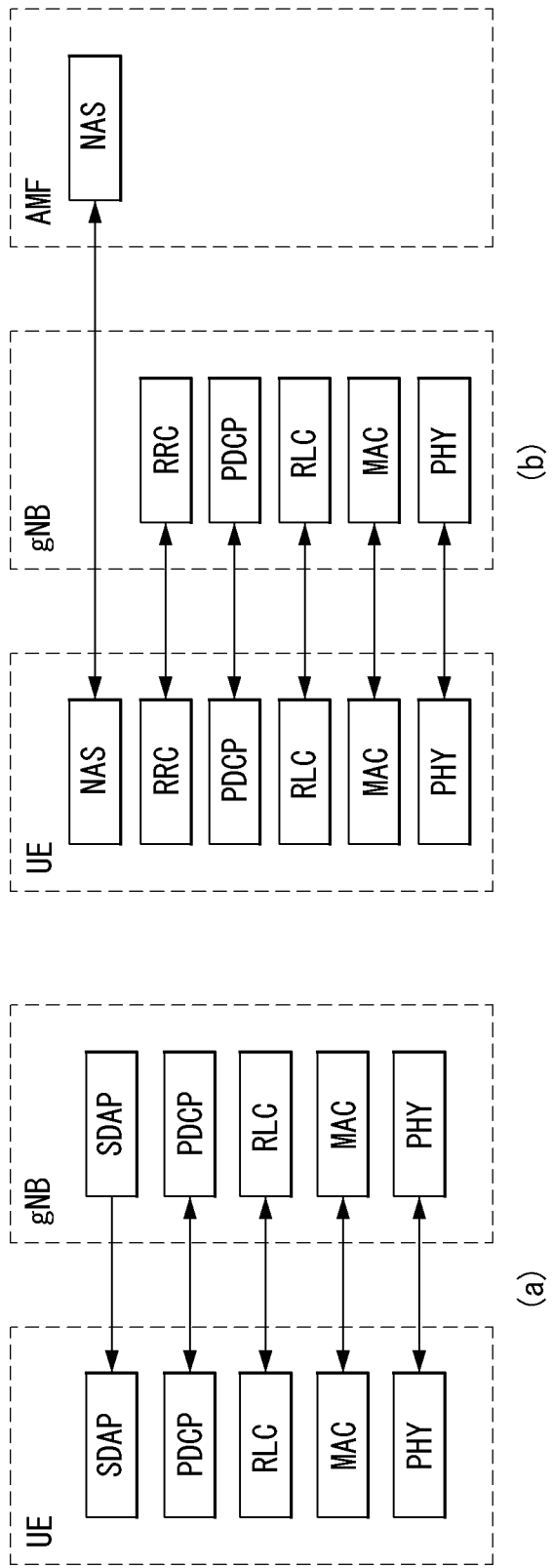
FIG. 4 is a diagram illustrating a radio protocol stack in a wireless communication system to which the present invention may be applied.

FIG. 4 illustrates a wireless protocol stack in a wireless communication system to which the present invention is applicable.

FIG. 4(a) illustrates a radio interface user plane protocol stack between a UE and gNB, and FIG. 4(b) illustrates a radio interface control plane protocol stack between the UE and the gNB.

The control plane means a path through which control messages used for a UE and a network to manage calls are transmitted. The user plane means a path through which data generated in an application layer, for example, voice data, Internet packet data, and so on are transmitted.

Referring to FIG. 4(a), the user plane protocol stack may be divided into Layer 1 (i.e., physical (PHY) layer) and Layer 2.

Referring to FIG. 4(b), the control plane protocol stack may be divided into Layer 1 (i.e., PHY layer), Layer 2, Layer 3 (i.e., radio resource control (RRC) layer), and a Non-Access Stratum (NAS) layer.

The Layer 2 is divided into a Medium Access Control (MAC) sublayer, a Radio Link Control (RLC) sublayer, a Packet Data Convergence Protocol (PDC) sublayer, and a Service Data Adaptation Protocol (SDAP) sublayer (in case of the user plane).

A radio bearer is classified into two groups: data radio bearer (DRB) for user plane data and signaling radio bearer (SRB) for control plane data.

Each layer of the control plane and the user plane of the radio protocol is described below.

1) The Layer 1, i.e., the PHY layer, provides information transfer service to an upper layer by using a physical channel. The PHY layer is connected to the MAC sublayer located at an upper level through a transport channel, and data are transmitted between the MAC sublayer and the PHY layer through the transport channel. The transport channel is classified according to how and which feature data is transmitted via a radio interface. And, data is transmitted between different PHY layers, between a PHY layer of a transmitter and a PHY layer of a receiver, through a physical channel.

2) The MAC sublayer performs mapping between a logical channel and a transport channel; multiplexing/de-multiplexing of MAC Service Data Unit (SDU) belonging to one or different logical channel(s) to/from a transport block (TB) delivered to/from the PHY layer through a transport channel; scheduling information reporting; error correction through hybrid automatic repeat request (HARM); priority handling between UEs using dynamic scheduling; priority handling between logical channels of one UE using logical channel priority; and padding.

Different kinds of data deliver a service provided by the MAC sublayer. Each logical channel type defines what type of information is delivered.

The logical channel is classified into two groups: a Control Channel and a Traffic Channel.

i) The Control Channel is used to deliver only control plane information and is as follows.

Broadcast Control Channel (BCCH): a downlink channel for broadcasting system control information.

Paging Control Channel (PCCH): a downlink channel that delivers paging information and system information change notification.

Common Control Channel (CCCH): a channel for transmitting control information between a UE and a network. This channel is used for UEs having no RRC connection with the network.

Dedicated Control Channel (DCCH): a point-to-point bi-directional channel for transmitting dedicated control information between the UE and the network. This channel is used by the UE having an RRC connection.

ii) The Traffic Channel is used to use only user plane information.

Dedicated Traffic Channel (DTCH): a point-to-point channel, dedicated to a single UE, for delivering user information. The DTCH may exist in both uplink and downlink.

In the downlink, connection between the logical channel and the transport channel is as follows.

The BCCH may be mapped to BCH. The BCCH may be mapped to DL-SCH. The PCCH may be mapped to PCH. The CCCH may be mapped to the DL-SCH. The DCCH may be mapped to the DL-SCH. The DTCH may be mapped to the DL-SCH.

In the uplink, connection between the logical channel and the transport channel is as follows. The CCCH may be mapped to UL-SCH. The DCCH may be mapped to the UL-SCH. The DTCH may be mapped to the UL-SCH.

3) The RLC sublayer supports three transmission modes: a Transparent Mode (TM), an Unacknowledged Mode (UM), and an Acknowledged Mode (AM).

The RLC configuration may be applied for each logical channel. In case of SRB, the TM or the AM is used. On the other hand, in case of DRB, the UM the AM is used.

The RLC sublayer performs the delivery of the upper layer PDU; sequence numbering independent of PDCP; error correction through automatic repeat request (ARQ); segmentation and re-segmentation; reassembly of SDU; RLC SDU discard; and RLC re-establishment.

4) A PDCP sublayer for the user plane performs Sequence Numbering; header compression and decompression (Robust Header Compression (RoHC) only); delivery of user data; reordering and duplicate detection (if the delivery to a layer above the PDCP is required); PDCP PDU routing (in case of a split bearer); re-transmission of PDCP SDU; ciphering and deciphering; PDCP SDU discard; PDCP re-establishment and data recovery for RLC AM; and duplication of PDCP PDU.

The PDCP sublayer for the control plane additionally performs Sequence Numbering; ciphering, deciphering and integrity protection; delivery of control plane data; duplicate detection; and duplication of PDCP PDU.

When duplication is configured for a radio bearer by RRC, an additional RLC entity and an additional logical channel are added to the radio bearer to control the duplicated PDCP PDU(s). The duplication at PDCP includes transmitting the same PDCP PDUs twice. Once it is transmitted to the original RLC entity, and a second time it is transmitted to the additional RLC entity. In this instance, the original PDCP PDU and the corresponding duplicate are not transmitted to the same transport block. Two different logical channels may belong to the same MAC entity (in case of CA) or different MAC entities (in case of DC). In the former case, logical channel mapping restriction is used to ensure that the original PDCP PDU and the corresponding duplicate are not transmitted to the same transport block.

5) The SDAP sublayer performs i) mapping between QoS flow and data radio bearer, and ii) QoS flow identification (ID) marking in downlink and uplink packet.

A single protocol entity of SDAP is configured for each individual PDU session, but exceptionally, in case of dual Connectivity (DC), two SDAP entities can be configured.

6) A RRC sublayer performs broadcast of system information related to Access Stratum (AS) and Non-Access Stratum (NAS); paging initiated by 5GC or NG-RAN; establishment, maintenance and release of RRC connection between UE and NG-RAN (additionally including modification and release of carrier aggregation and also additionally including modification and release of Dual Connectivity between E-UTRAN and NR or in NR); security function including key management; establishment, configuration, maintenance and release of SRB(s) and DRB(s); delivery of handover and context; UE cell selection and re-release and control of cell selection/reselection: mobility function including inter-RAT mobility; QoS management function, UE measurement reporting and control of reporting; detection of radio link failure and recovery from radio link failure; and NAS message delivery from NAS to UE and NAS message delivery from UE to NAS.

Session and Service Continuity (SSC)

In 3GPP SA2, discussion about a method for supporting session and service continuity according to the mobility of a UE is in progress.

In a next-generation system (e.g., 5G system), a solution for supporting three SSC modes is discussed.

In the solution, a PDU session present between a UE and a user plane function (hereinafter referred to as a "terminating user-plane function (TUPF)", but may be substituted with the above-described UPF) is assumed. The TUPF terminates a 3GPP user plane, and interacts with a data network.

1) SSC mode definition

A next-generation system supports the following SSC modes.

SSC mode 1: the same TUPF is maintained regardless of an access technology (e.g., RAT and cell) being used by a UE in order to access a network.

SSC mode 2: the same TUPF is maintained only through a partial set (i.e., one or more, but not all) of access network attachment points (e.g., cell and RAT) referred to as the serving area of a TUPF. When a UE gets out of the serving area of a TUPF, the UE is served by a different TUPF suitable for a new attachment point to the network of the UE.

SSC mode 3: in this mode, a network allows the establishment of UE continuity toward the same data network (DN) via a new TUPF before a connection between the UE and a previous TUPF is terminated. When a trigger condition is applied, the network selects a target TUPF suitable for a new attachment point toward the network of the UE. While the two TUPFs are activated, the UE actively rebinds an application from a previous address/prefix to a new address/prefix or waits until a flow bound with a previous address/prefix is terminated.

Figure 5:
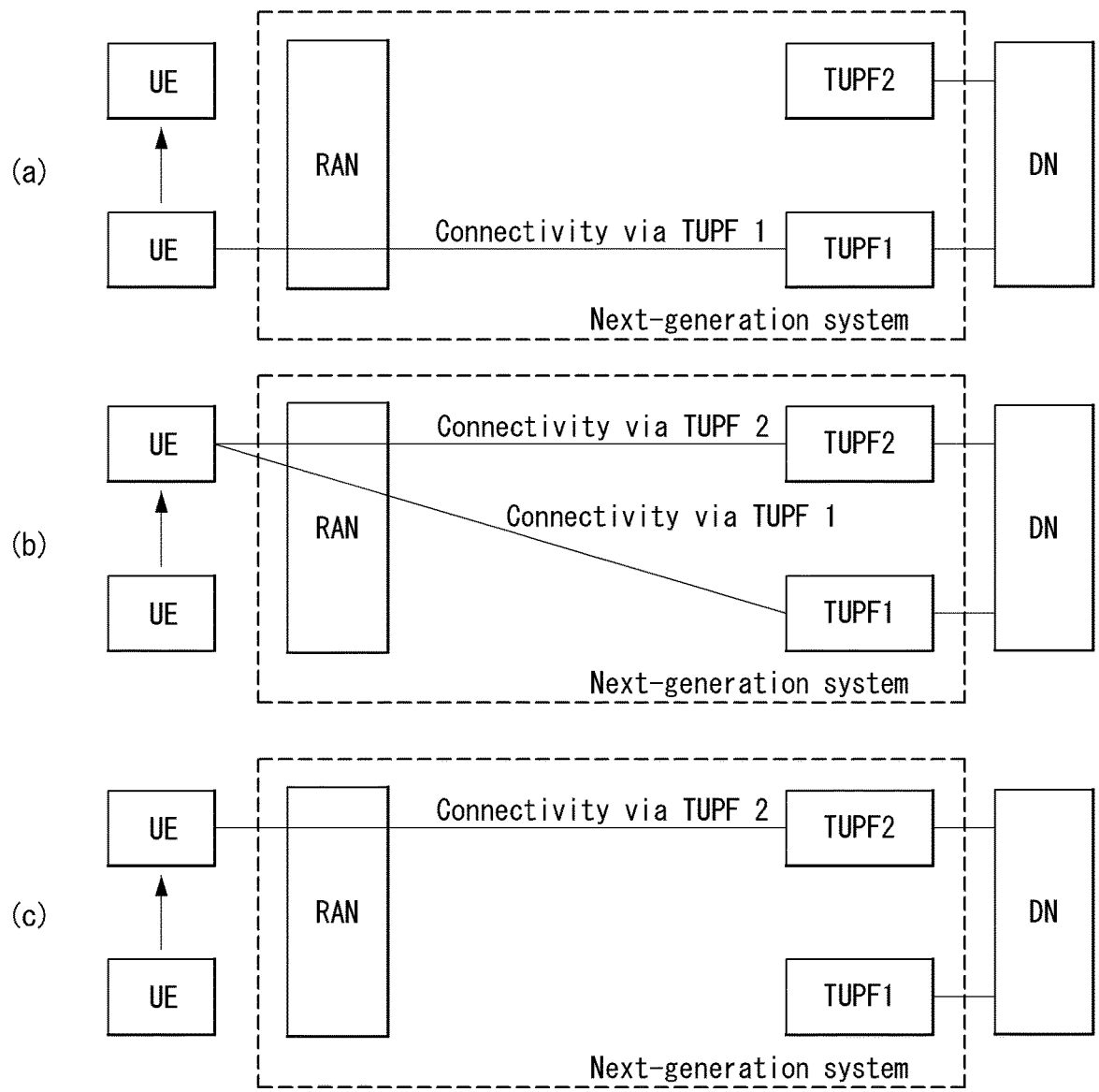
FIG. 5 is a diagram illustrating the TUPF redeployment of a session and service continuity mode 3 in a wireless communication system to which the present invention may be applied.

FIG. 5 is a diagram illustrating the TUPF redeployment of the session and service continuity mode 3 in a wireless communication system to which the present invention may be applied.

When a UE moves while having connectivity via a TUPF 1 as in FIG. 5(a), the UE has both connectivity via a TUPF 2 and the connectivity via the TUPF 1 as in FIG. 5(b). Thereafter, as the connectivity via the TUPF 1 is released as in FIG. 5(c), the UE has only the connectivity via the TUPF 2.

2) Mode selection and network support

In relation to mode selection and network support, the following principle is applied:

When requesting a PDU session, a UE may indicate a requested SSC mode as part of PDU session setup signaling with respect to a network. A method of determining a requested SSC mode by a UE is described later.

A serving network receives, from a subscription database, a list of SSC modes supported for each data network for each subscriber and a default SSC mode as part of subscription information.

The serving network selects an SSC mode by accepting the requested SSC mode or modifying the requested SSC mode based on the subscription information and/or a local configuration.

When the UE requests a new PDU session, if an SSC mode is not provided, the network applies the local configuration for selecting a default SSC mode (for connection to a data network) listed in the subscription information or selecting the SSC mode.

After selecting the SSC mode, (a) the network accepts the PDU session request from the UE and indicates the selected SSC mode accepted for the UE or (b) the network rejects the PDU session request and transmits the selected SSC mode and a cause value to the UE in order to indicate that the selected SSC mode is already used by another PDU session within the UE.

The SSC mode is applied for each PDU session. The UE requests a different SSC mode in a different PDU session. That is, different PDU sessions activated at the same time for the same UE may have different SSC modes.

The SSC mode is not changed during the lifetime of the PDU session.

TUPF selection: when selecting a TUPF for the PDU session, the network takes into considerate on the current attachment point of the UE and the requested SSC mode.

3) SSC mode 1

In relation to the SSC mode 1, the following principle is applied:

An allocated TUPF is maintained during the lifetime of a PDU session. That is, the TUPF is not changed by a network.

4) SSC mode 2

In relation to the SSC mode 2, the following principle is applied:

Redirection trigger to a different TUPF: a network determines whether a TUPF allocated to the PDU session of a UE needs to be redirected based on UE mobility, a local policy (i.e., information on the serving area of the allocated TUPF).

Redirection procedure: a network redirects traffic of a UE to a different TUPF by first releasing a user plane path associated with a current TUPF and then setting up a user plane path corresponding to a new TUPF. The following two solutions are used. In one solution, when a TUPF is reallocated, a PDU session is preserved. In the other solution, a network disconnects the PDU session of a UE corresponding to a current TUPF and requests the UE to immediately activate a PDU session (a result of the selection of a new TUPF) again. During the process, the UE maintains an attached state. The network selects a TUPF based on the current attachment point of the UE toward the network.

5) SSC mode 3

In relation to the SSC mode 3, the following principle is applied:

Redirection trigger toward a different TUPF: a network determines whether a TUPF allocated to the PDU session of a UE needs to be redirected based on a local policy (i.e., information on the serving area of the allocated TUPF).

Redirection procedure: a network indicates whether traffic on one of the activated PDU sessions of a UE needs to be redirected with respect to the UE. Furthermore, the network starts a timer and indicates a timer value with respect to the UE. A user plane path is established toward a new TUPF. The following two solutions are used. In one solution, a PDU session is reused for an additional user plane path. In the other solution, an additional PDU session is re-established. The network selects a TUPF based on the current attachment point of the UE toward the network. If a UE has transmitted a request for an additional PDU session to the same DN without previous indication, indicating that an activated PDU session needs to be redirected, from a network, the network rejects the request of the UE.

If a new user plane path associated with the new TUPF has been established, the UE may perform one of the following options.

Option 1: the UE actively redirects an application flow, bound with a previous TUPF, to a new TUPF (e.g., using a higher layer session continuity mechanism). When the UE completes the redirection of the application flow to the new TUPF, the previous TUPF is released.

Option 2: the UE steers a new application flow toward a new TUPF. A previous flow via a previous TUPF continues until the flow is terminated. When all flows using the previous TUPF are terminated, the previous TUPF is released. When Option 2 is used, a multi-homed PDU session may be used to transmit an application flow bound with the previous TUPF. A tunnel between the previous TUPF and the new TUPF is used to forward such a flow.

If a previous TUPF has not been released when a timer expires or a network detects that a previous TUPF has been deactivated, the network releases the previous TUPF.

6) Method of determining required SSC mode by UE

A UE may determine an SSC mode required for an application using one of the following methods.

Figure 6:
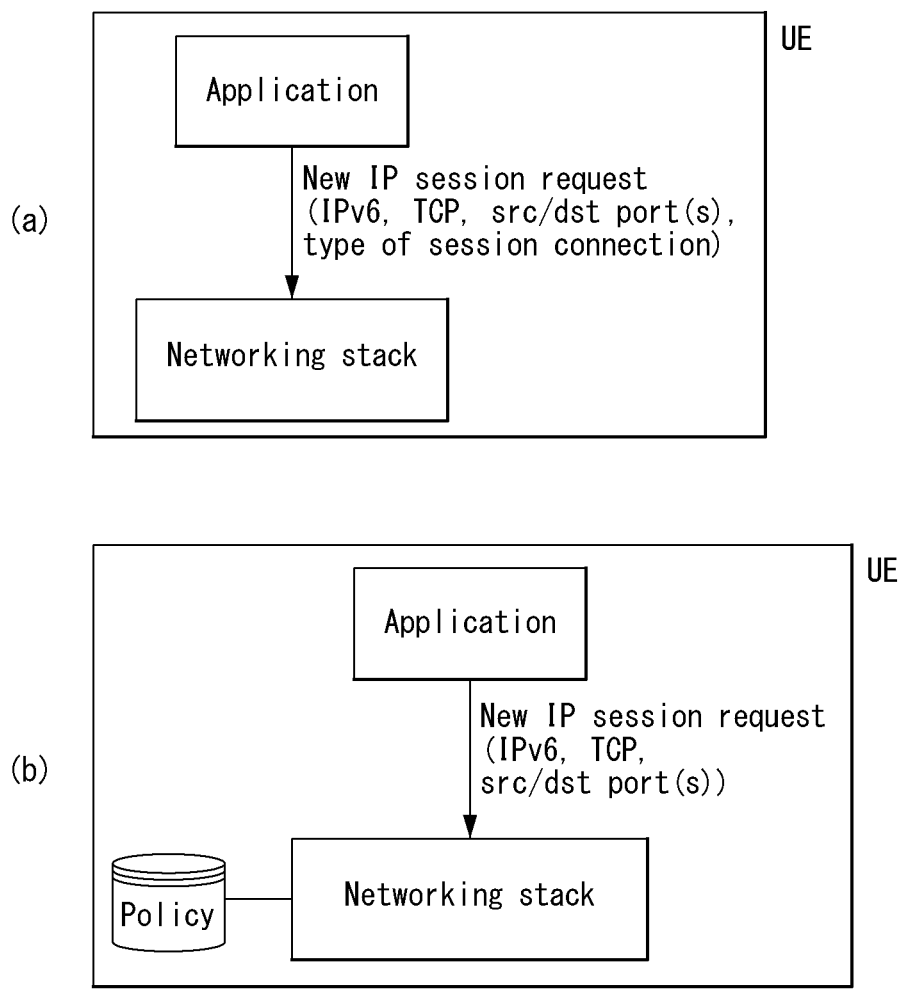
FIG. 6 is a diagram illustrating a method of determining a required SSC mode by a UE in a wireless communication system to which the present invention may be applied.

FIG. 6 is a diagram illustrating a method of determining a required SSC mode by a UE in a wireless communication system to which the present invention may be applied.

Referring to FIG. 6(*a*), an application starts a new flow (i.e., opens a new socket), and indicates a session continuity type required for the flow. Furthermore, a new IP session request may include an IP version (e.g., IPv6), a source port (src port)/destination port (dst port). This may be indicated using a socket application program interface (API) extension specified in Request for Comments (RFC) 3493, RFC 3542, and IETF Draft Document "draft-ietf-dmm-ondemand-mobility", that is, Internet documents of Internet Engineering Task Force (IETF). In other words, the application may use an already known software API(s) in order to indicate which type of session continuity is required. For example, when the application requests a socket as a nomadic IP address, the application requests the SSC mode 2. When the application requests a fixed IP address or a sustained IP address, the application requests the SSC mode 1 or the SSC mode 3. The nomadic IP address, fixed IP address, and sustained IP address follow the definition of IETF draft document "draft-ietf-dmm-ondemand-mobility."

Referring to FIG. 6(*b*), if an application starting a flow does not indicate the type of requested session continuity, a UE may determine the requested session continuity using a previously provisioned policy. A new IP session request may include an IP version (e.g., IPv6), a transmission control protocol (TCP), a source port (src port)/destination port (dst port).

A policy includes a list of prioritized rules. Each rule indicates a required SSC mode for all applications or a specific flow type. For example, a policy within a UE may include the following rules.

Rule 1, priority 1: App=com.example.skype, required continuity type=SSC mode 3.

Rule 2, priority 2: App=com.example.web.server, required continuity type=SSC mode 1.

Rule 3, priority 3: protocol=TCP; destination port (Dst-Port)=80, required continuity type=SSC mode 2.

A default rule: a default continuity type=SSC mode 2.

When a UE attempts to establish a PDU session before it receives a request from an application (e.g., during the first attach) or when the application does not request an SSC mode, or when a UE does not have a policy for a specific application, the UE cannot determine an SSC mode as described above. In this case, the UE may operate as follows:

If a default SSC mode (e.g., as part of a policy as in FIG. 6(*b*)) has been previously provisioned in the UE, the UE requests a PDU session as the default SSC mode. The default SSC mode may be one of the above three SSC modes. For example, a fixed Internet of things (IoT) sensor (or although it is a smartphone) may be previously provisioned as the default SSC mode 2.

If the default SSC mode has not been previously provisioned in the UE, the UE does not provide an SSC mode and requests a PDU session. In this case, a network determines the SSC mode of a PDU session (e.g., based on subscription data and/or network policy), and provides the UE with a selected mode.

7) PDU session establishment/release procedure triggered by handover procedure

Figure 7:
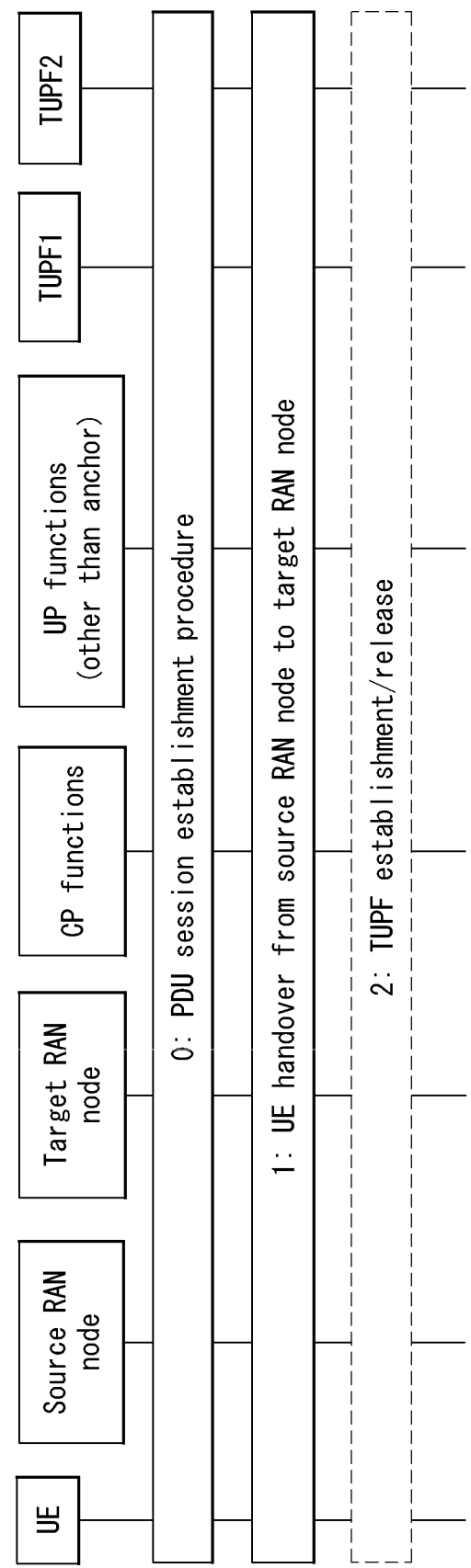
FIG. 7 illustrates a PDU session establishment/release procedure for a different SSC mode triggered by handover in a wireless communication system to which the present invention may be applied.

FIG. 7 illustrates a PDU session establishment/release procedure for a different SSC mode triggered by handover in a wireless communication system to which the present invention may be applied.

0. A UE is attached to a network and establishes a PDU session with a DN(s). The UE may request different SSC modes for different PDU sessions.

1. The UE performs handover from a source RAN node to a target RAN node.

2. In the case of the SSC mode 2 or 3, as described above, a TUPF redirection is triggered. That is, a user plane path for a TUPF1 is released, and a user plane path for a TUPF2 is established.

8) Service continuity call flow

The setup of a new TUPF for the SSC modes 2 and 3 is always triggered by CP functions within a next-generation core network. The following two options are present.

CN-provided trigger followed by UE-requested PDU session establishment

CN-prepared PDU session modification followed by notification for a UE (may be applied to only a multi-home PDU session)

9) CN-provided trigger followed by UE-requested PDU session (SSC mode 3)

This procedure corresponds to a PDN connectivity model within an EPS in which a new PDN connection is always requested by a UE.

Figure 8:
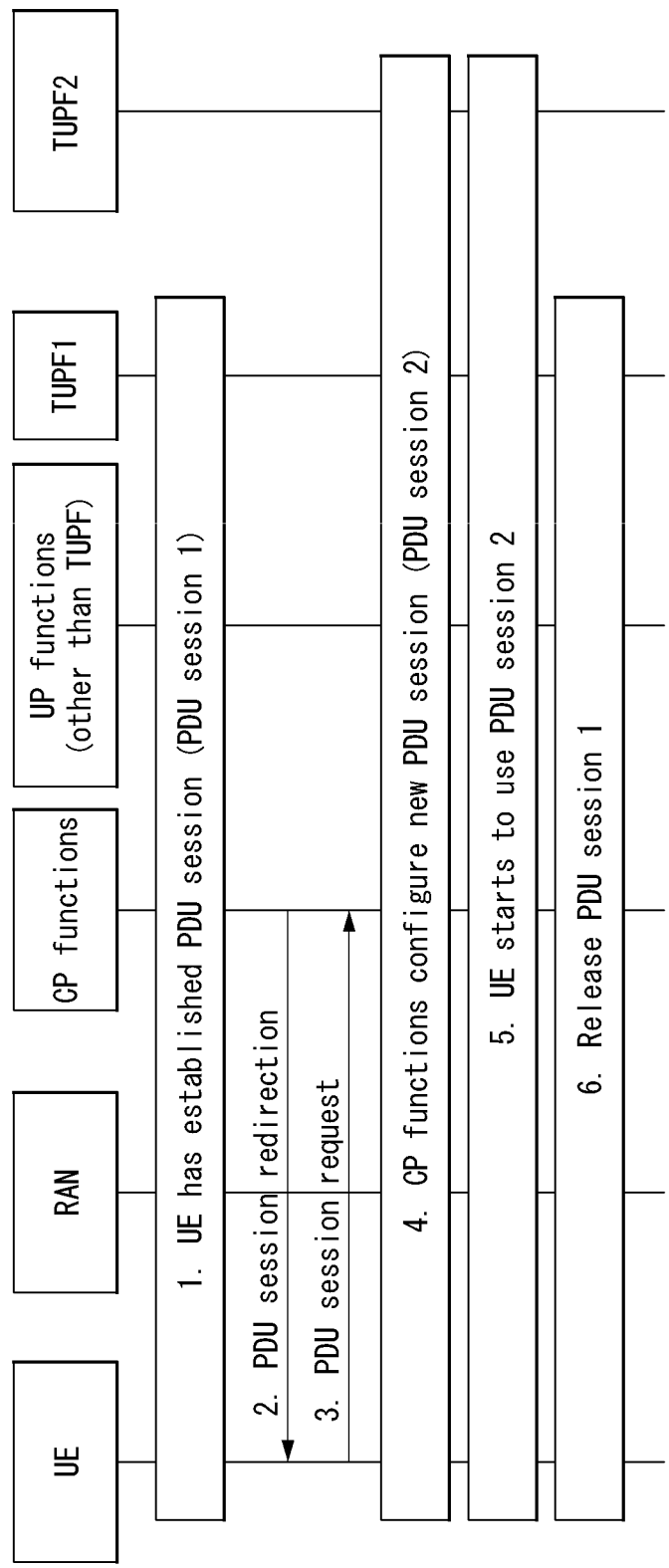
FIG. 8 illustrates a CN-provided trigger procedure followed by a UE-requested PDU session in a wireless communication system to which the present invention may be applied.

FIG. 8 illustrates a CN-provided trigger procedure followed by a UE-requested PDU session in a wireless communication system to which the present invention may be applied.

FIG. 8 illustrates a method of establishing a UE-requested PDU session in order to support the SSC mode 3.

1. A UE has a PDU session established with a TUPF (PDU session 1). A PDU session user plane path includes an RAN, a TUPF1 and an available middle user plane function (other than a TUPF).

2. When the TUPF1 becomes suboptional due to UE mobility at a specific point of time, CP functions determine to establish a new PDU session. The CP functions transmit a PDU session redirection (including a cause, a timer) message to the UE. A cause code triggers the UE so that the UE does not releases the PDU session 1 and requests a new PDU session for the same data network. A timer value indicates how long the network maintains the PDU session 1.

3. The UE transmits a PDU session request (including a cause) message in order to request a new PDU session. A cause code indicates that the message is a response to a network-provided trigger.

4. The CP functions selects a new TUPF (i.e., TUPF 2) geographically close to a current UE location, and configures a user plane path to a PDU session 2 including an RAN, the TUPF 2, and middle user plane nodes. In the case of a PDU session of an IP type, the TUPF 2 allocates a new IP address/prefix (IP@2) and transmits it to the UE (e.g., using a router advertisement or via CP functions and NG1 signaling).

5. The UE starts to use the PDU session 2 for the entire new traffic flow. Furthermore, the UE늠 may move the existing traffic flow from the PDU session 1 to the PDU session 2 using a higher layer mobility mechanism (e.g., session initiation protocol (SIP) reINVITE, dynamic adaptive streaming over HTTP (DASH), multi-path TCP (MPTCP), host identity (ID), stream control transmission protocol (SCTP)).

6. The PDU session is released by the UE (e.g., when the UE consolidates all types of traffic on the PDU session 2) or by the network when a timer indicated in step 2 expires.

10) CN-prepared PDU session modification followed by notification to UE (SSC mode 3)

This procedure is applied to a multi-homed PDU session.

Figure 9:
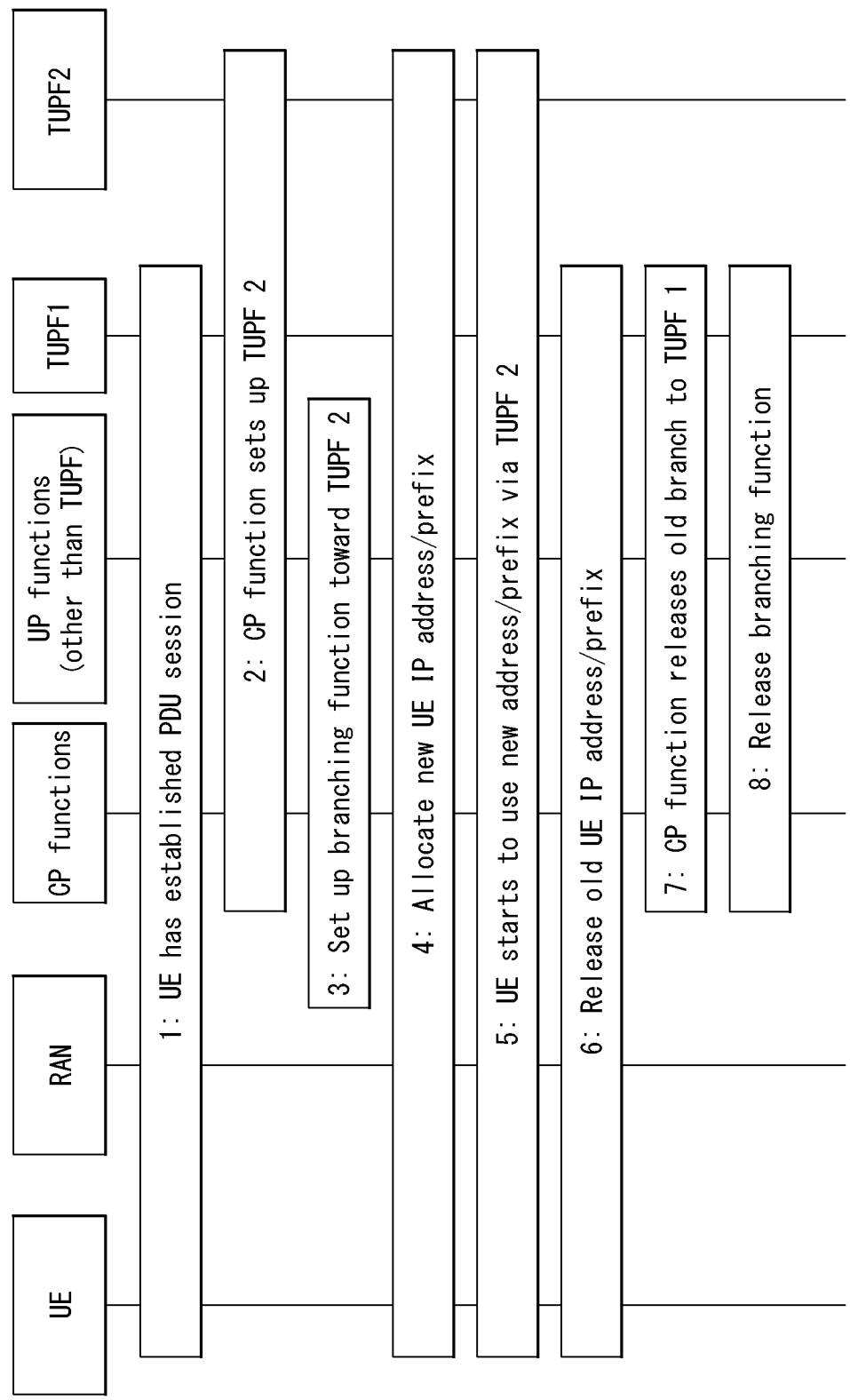
FIG. 9 illustrates a CN-prepared PDU session modification procedure followed by notification to a UE in a wireless communication system to which the present invention may be applied.

FIG. 9 illustrates a CN-prepared PDU session modification procedure followed by notification to a UE in a wireless communication system to which the present invention may be applied.

A next-generation core network prepares a new PDU session and may notify a UE of the presence of a new IP address/prefix.

1. A UE has a PDU session established with a TUPF1. A PDU session user plane path includes an RAN, the TUPF1 and an available middle user plane function (other than an IP anchor).

2. When the existing branch becomes suboptional due to UE mobility at a specific point of time, CP functions determine to establish a new branch of the PDU session 1. The CP functions select a new TUPF (TUPF2) close to a current UE location, and configure the TUPF 2 as a new branch of a multi-homed PDU session. The TUPF 2 allocates a new IP address/prefix (IP2@) and transmits it to the CP functions.

3. The CP functions configure one of middle user plane nodes as a branching point for a multi-homed PDU session. The CP may insert the new user plane node into the path so that it operates as a branching point. The user plane node operating as the branching point may be collocated with other entities.

4. The network notifies the UE of the availability of the new IP address/prefix. This may be performed using an IPv6 Router Advertisement or a control message.

5. The UE may start to use IP@2 with respect to all types of new traffic, and may move the existing traffic flow from IP@1 (the existing IP address/prefix) to IP@2 using a higher layer mobility mechanism (e.g., SIP reINVITE, DASH, MPTCP, Host ID, SCTP).

6. The network releases the old IP address/prefix of the UE. In this case, the UE stops the use of the old IP address/prefix.

7. The CP releases an old branch in the TUPF1.

8. The CP releases the branching function. If necessary, a, a branching entity may be removed from the user plane path.

11) CN-provided trigger followed by UE-requested PDU session establishment (SSC mode 2)

This procedure corresponds to a PDN connectivity model within an EPS in which a new PDN connection is always requested by a UE.

Figure 10:
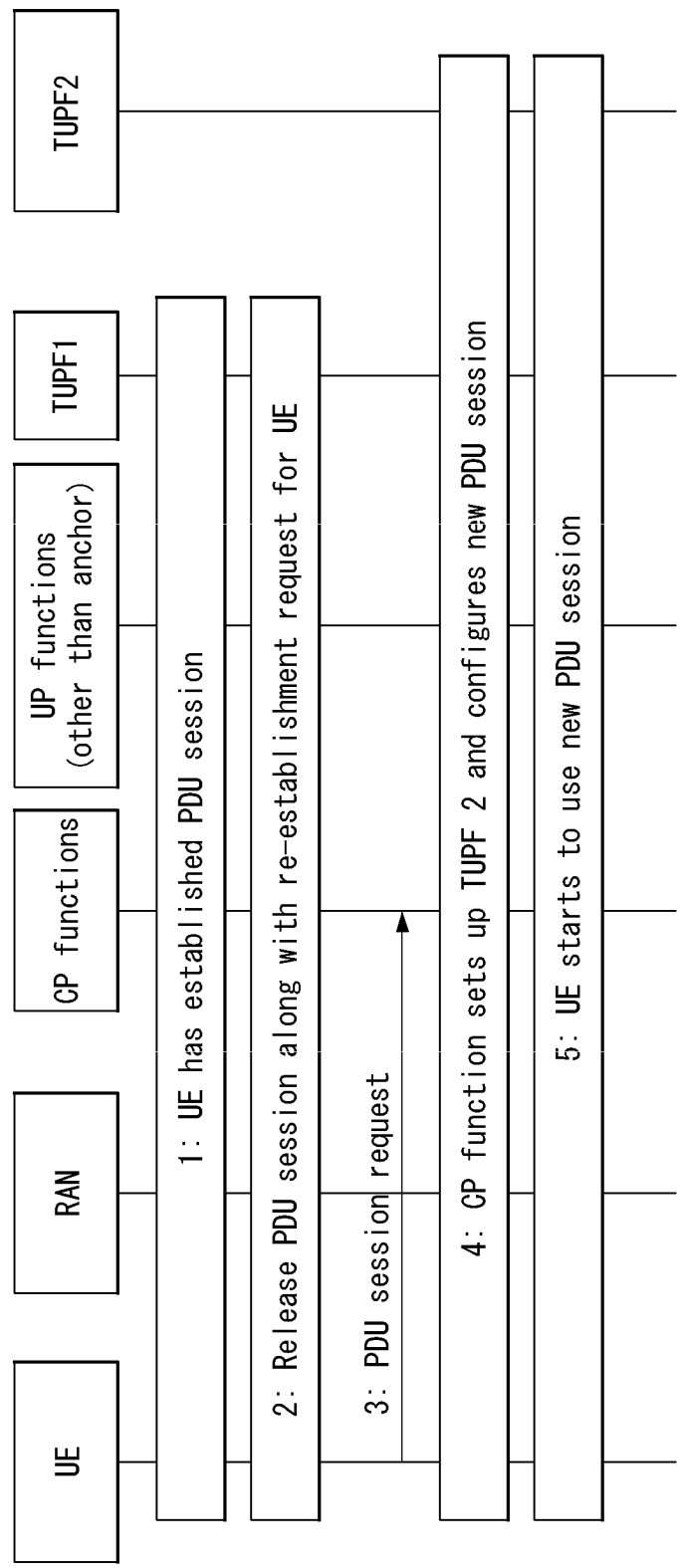
FIG. 10 illustrates a CN-provided trigger procedure followed by UE-requested PDU session establishment in a wireless communication system to which the present invention may be applied.

FIG. 10 illustrates a CN-provided trigger procedure followed by UE-requested PDU session establishment in a wireless communication system to which the present invention may be applied.

FIG. 10 illustrates a method of establishing a UE-requested PDU session in order to support the SSC mode 2.

1. A UE has a PDU session established with a TUPF1 (PDU session 1). A PDU session user plane path includes an RAN, the TUPF1 and an available middle user plane function (other than a TUPF).

2. When the TUPF1 becomes suboptional due to UE mobility at a specific point of time, CP functions determine a new TUPF. The CP functions release the existing PDU session along with a message, indicating that a new PDU session needs to be re-established with respect to the UE.

3. The UE transmits a PDU session request message in order to request a new PDU session.

4. The CP functions select a new TUPF (TUPF 2) close to a current UE location, and configure a user plane path for a new PDU session, including the RAN, the TUPF 2, and middle user plane nodes. In the case of a PDU session of an IP type, the TUPF 2 allocates a new IP address/prefix (IP@2) and transmits it to the UE (e.g., using a router advertisement or via the CP functions and NG1 signaling).

5. The UE starts to use the new PDU session for all traffic flows. The UE may move the traffic flow from the TUPF1 to the TUPF2 using a higher layer mobility mechanism (e.g., SIP reINVITE).

12) CN-prepared PDU session modification followed by notification to UE (SSC mode 2)

This procedure is applied to a multi-homed PDU session using IPv6.

Figure 11:
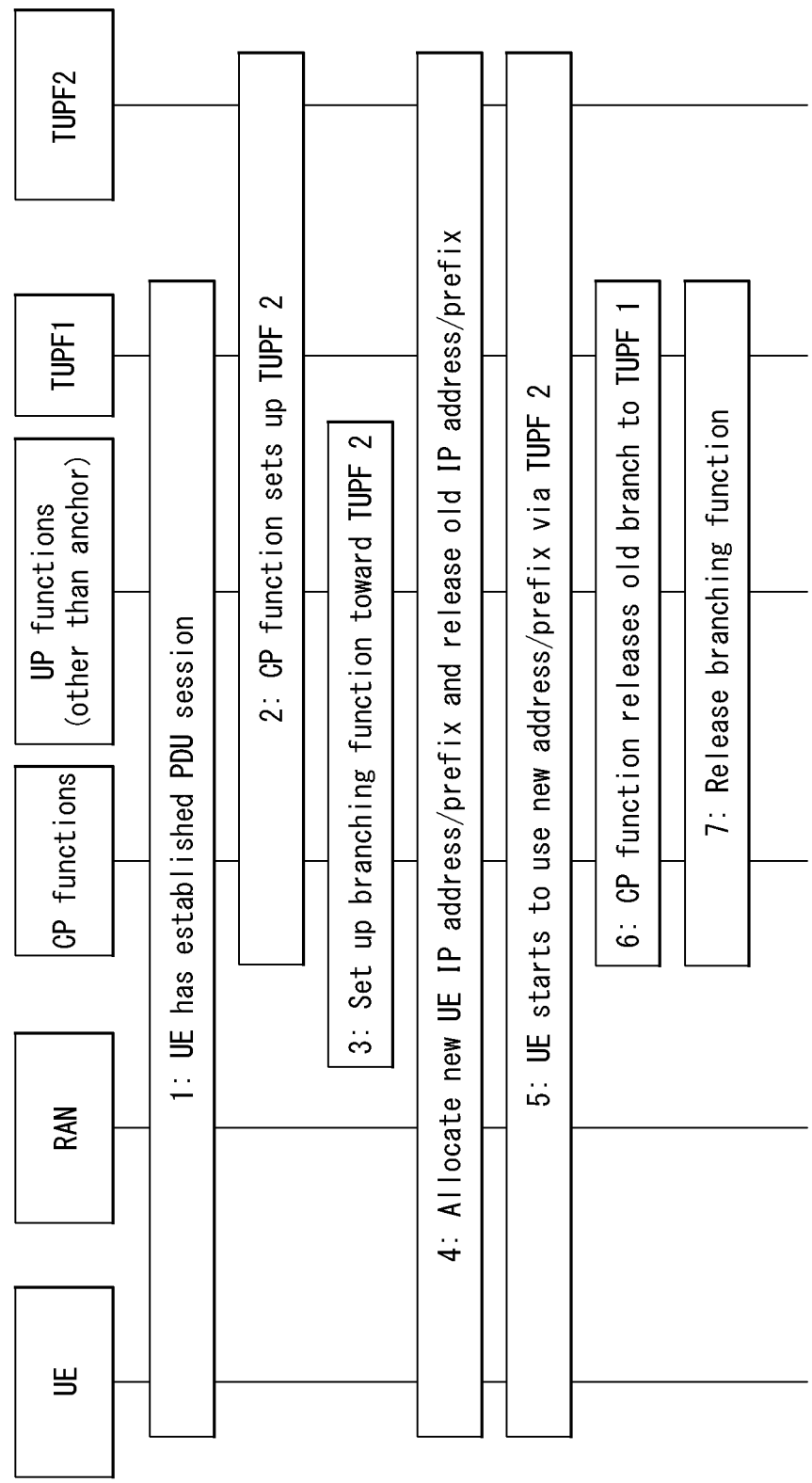
FIG. 11 illustrates a CN-prepared PDU session modification procedure followed by notification to a UE in a wireless communication system to which the present invention may be applied.

FIG. 11 illustrates a CN-prepared PDU session modification procedure followed by notification to a UE in a wireless communication system to which the present invention may be applied.

A next-generation core network prepares a new PDU session, and may notify a UE of the presence of a new IP address/prefix.

1. A UE has a PDU session established with a TUPF1. A PDU session user plane path includes an RAN, the TUPF1 and an available middle user plane function (other than an IP anchor).

2. When the existing branch becomes suboptional due to UE mobility at a specific point of time, CP functions determine to establish a new branch of the PDU session 1. The CP functions select a new TUPF (TUPF2) close to a current UE location, and configure the TUPF 2 as a new branch of the session. The TUPF 2 allocates a new IP address/prefix (IP2@), and transmits it to the CP functions. At this time, the UE is not yet involved.

3. The CP functions configure one of middle user plane nodes as a branching point for a PDU session. The CP may insert the new user plane node into the path so that it operates as a branching point. The user plane node operating as the branching point may be collocated with other entities (e.g., along with the RAN).

4. The network notifies the UE of the availability of the new IP address/prefix. The UE releases an old IP address/prefix as soon as the UE configures the use of the new IP address/prefix. This may be performed using an IPv6 Router Advertisement or a control message.

5. The UE starts to use IP@2 with respect to all type of new traffic, and may move the existing traffic flow from IP@1 (the existing IP address/prefix) to IP@2 using a higher layer mobility mechanism (e.g., SIP reINVITE).

6. The CP releases an old branch in the TUPF1.

7. The CP releases the branching function. If necessary, a branching entity may be removed from the user plane path.

As described above, a UE may select an SSC mode in response to a request from an application, and may indicate the selected SSC mode when it transmits a PDU session request to a network. Alternatively, a UE may select an SSC mode based on a rule previously provisioned in the UE, and may indicate the selected SSC mode when it transmits a PDU session request.

Furthermore, one PDU session supports only one SSC mode. In order to use another SSC mode, a UE needs to request a new PDU session.

Session and Service Continuity (SSC) Mode Selection Method

In the EPC, a method of continuously maintaining a P-GW without changing it was used in order to support session continuity. Accordingly, a UE could continue to use the same IP address because a P-GW is not changed regardless of which application is used.

In such management, however, in order for UEs that do not require session/service continuity to continuously maintain an IP address, a network must support the mobility of a UE using general packet radio service (GPRS) tunneling protocol (GTP) tunneling.

Such an operation of the network corresponds to an unnecessary operation for a UE that does not require session/service continuity. Accordingly, a next-generation network (e.g., 5G system) defines some SSC modes as described above so that an optimized operation can be performed.

A data network name (DNN) is used to describe a data network and used for a UE to indicate a data network to be connected by the UE. The DNN is configured by an operator and is a semi-static value. In contrast, an SSC mode requested for a specific service is determined by a service provider. When an SSC mode is indicated as part of a DNN, an operator may need to update the DNN configuration of all UEs whenever a service provider introduces a new service. Furthermore, the operator may want to limit the SSC mode based on subscription information, that is, more dynamic information, compared with the DNN configuration.

Various continuity requirements of a UE for different applications/services may be satisfied by supporting SSC within a 5G system architecture. A 5G system supports different SSC modes. An SSC mode associated with a PDU session anchor is not changed during the lifetime of a PDU session.

Each SSC mode may be defined as follows. This is one example for convenience of description, and the present invention is not limited thereto. That is, although the definition of each SSC mode is different from the following description, the present invention may be applied to a wireless communication system in which a plurality of SSC modes is defined in order to support different service continuities.

1) SSC mode 1: a network preserves continuity services provided to a UE. In the case of a PDU session of an IP type, an IP address is preserved. In the PDU session anchor of the SSC mode 1, when a PDU session is established, an UPF (or TUPF) operating as the PDU session anchor may preserve an access technology (e.g., access type and cell(s)) that is being used by a UE in order to access a network. That is, the following principle may be applied:

An allocated TUPF (or UPF) may be preserved during the lifetime of a PDU session. That is, the TUPF (or UPF) may not be changed by a network.

In the case of a PDU session of an IP type, IP continuity is supported regardless of a UE mobility event.

An IPv6 multi-homing or uplink classifier (UL CL) is applied to a PDU session within the SSC mode 1. When a network allocates an additional PDU session anchor to the PDU session (based on a local policy), an additional PDU session anchor may be released or may be allocated. Furthermore, a UE does not expect that an additional IPv6 prefix is preserved during the lifetime of the PDU session.

The SSC mode 1 may be applied to a PDU session type and an access type.

2) SSC mode 2: a PDU session anchor (i.e., TUPF or UPF) may be preserved only within a subset (i.e., one or more) of access network attach points (e.g., cell(s) and RAT(s)) which may be referred to as the serving area of a PDU session anchor. When a UE gets out of the serving area of the PDU session anchor, the UE may be served by a different PDU session anchor suitable for a new Attach point toward the network of the UE. That is, to preserve the PDU session anchor when a PDU session is established is not guaranteed.

If the SSC mode 2 is used, a network may release continuity services forwarded to a UE and may release a corresponding PDU session. For example, in the case of a PDU session of an IP type, a network may release an IP address(es) allocated to a UE.

If a PDU session of the SSC mode 2 has a single PDU session anchor, a network may trigger the release of the PDU session, and may instruct a UE to immediately establish a new PDU session in the same data network. A trigger condition (e.g., a request from an application function based on a load state) follows an operator policy. When a new PDU session is established, a new UPF operating as a PDU session anchor may be selected.

In contrast, if a PDU session of the SSC mode 2 has multiple PDU session anchors (i.e., in the case of a multi-homed PDU session or if UL CL is applied to a PDU session of the SSC mode 2), an additional PDU session anchor may be released or allocated.

The SSC mode 2 may be applied to a PDU session type and an access type.

The following principle may be applied:

Trigger of redirection to a different TUPF (or UPF): a network may determine whether a TUPF (or UPF) to which the PDU session of a UE has been allocated needs to be redirected based on UE mobility or a local policy (e.g., information on the serving area of the allocated TUPF (or UPF)).

Redirection procedure: a network may redirect traffic of a UE to a different TUPF (or UPF) by first releasing a user plane path associated with a current TUPF (or UPF) and then setting a user plane path corresponding to a new TUPF (or UPF). In this case, two solutions may be used: One solution is a method of preserving a PDU session when a TUPF (or UPF) is reallocated, and the other solution is a method of disconnecting the PDU session of a UE corresponding to a current TUPF (or UPF) and requesting the UE to immediately reactivate a PDU session so that a new TUPF (or UPF) is selected. During the procedure, the UE may maintain an attached state. The network may select a TUPF (or UPF) based on a current attach point toward the network of the UE.

3) SCC mode 3: In this mode, a network allows the establishment of UE connectivity via a new PDU session anchor to the same data network (DN) before a connection between the UE and a previous PDU session anchor (e.g., UPF or TUPF) is released. When a trigger condition is applied, the network determines whether to select a PDU session anchor (e.g., UPF or TUPF) suitable for a new condition (e.g., a new attach point to the network) of the UE. While all the TUPFs are activated, the UE may actively rebind an application from the previous TUPF to a new address/prefix or the UE may wait until flows bound with a previous address/prefix are terminated.

If the SSC mode 3 is used, a UE may be aware of a change in the user plane, but a network can guarantee that the UE does not lose connectivity. In order to allow better service continuity, connectivity through a new PDU session anchor point (i.e., a new attach point) may be established before previous connectivity is terminated. For example, in the case of a PDU session of an IP type, an IP address may not be maintained during anchor redeployment.

The SSC mode 3 may be applied to any PDU session type and any access type.

In the case of a PDU session of an IP type, during a change procedure of a PDU session anchor:

A new IP prefix anchored on a new PDU session anchor may be allocated within the same PDU session, or A new IP prefix anchored on a new PDU session anchor may be applied to an additional PDU session anchor of a setup PDU session within the SSC mode 3 or a setup PDU session within the SSC mode 1.

A new IP address/prefix may be allocated within a new PDU session triggered so that it is established by a UE.

This may be applied to only the case of a setup PDU session within the SSC mode 3.

After a new IP address/prefix is allocated, an old IP address/prefix is maintained for a given time indicated by a UE and then released.

In the case of multiple PDU session anchors (i.e., in the case of a multi-homed PDU session or if UL CL is applied to the PDU session of the SSC mode 3), an additional PDU session anchor may be released or may be allocated.

The following principle may be applied:

Trigger of redirection to a different TUPF (or UPF): a network may determine whether a TUPF (or UPF) to which the PDU session of a UE has been allocated needs to be redirected based on UE mobility or a local policy (e.g., information on the serving area of the allocated TUPF (or UPF)).

Redirection procedure: a network may indicate that traffic for one of the activated PDU session of a UE needs to be redirected with respect to the UE. Furthermore, the network may start a timer and indicate a timer value with respect to the UE. A user plane path may be established toward a new TUPF (or UPF). In this case, two solutions may be used: One solution is a method of reusing a PDU session for an additional user plane path, and the other solution is a method of establishing an additional PDU session. The network may select a new TUPF (or UPF) based on a current attach point toward the network of the UE. If the UE has transmitted a request for an additional PDU session to the same DN without previous indication, indicating that the activated PDU session needs to be redirected, from the network, the network may reject the request of the UE.

When a new user plane path associated with a new TUPF (or UPF) is established, a UE may perform one of the following options.

Option 1: the UE may actively redirect an application flow bound from a previous TUPF (or UPF) to a new TUPF (or UPF) (e.g., using a higher layer session continuity mechanism). When the UE completes the redirection of the application flow to the new TUPF (or UPF), the previous TUPF (or UPF) may be released.

Option 2: a UE may steer a new application flow into a TUPF (or UPF). A flow via a previous TUPF (or UPF) may continue until the flow is terminated. When all flows using the previous TUPF (or UPF) are terminated, the previous TUPF (or UPF) may be released. When Option 2 is used, a multi-homed PDU session may be used to transmit an application flow bound with the previous TUPF (or UPF). A tunnel between the previous TUPF (or UPF) and the new TUPF (or UPF) may be used to forward these flows.

If the previous TUPF (or UPF) has not been released when a timer expires or a network detects that a previous TUPF (or UPF) has been deactivated, the network may release the previous TUPF (or UPF).

An SSC mode selection is described.

An SSC mode selection policy may be used to determine the type and service continuity (SSC) mode of a session associated with an application or a group of applications for a UE or a session.

An operator may previously configure an SSC mode selection policy for a UE. This policy may include one or more SSC mode selection policy rules used by a UE in order to determine the type of SSC mode associated with an application or a group of applications. This policy may include a default SSC mode selection policy rule matched with all applications within a UE.

When an application requests data transmission (e.g., network socket open) and the application itself does not specify a requested SSC mode, a UE may determine an SSC mode. The UE may determine the SSC mode associated with the application using an SSC mode selection policy, and:

If the UE already has an activated PDU session matched with the SSC mode associated with the application, the UE may route the data of the application within a PDU session unless another condition within the UE grants the use of a PDU session. Otherwise, the UE may request the establishment of a new PDU session having an SSC mode matched with the SSC mode associated with the application.

b) An SSC mode associated with an application may be any one of an SSC mode included in a non-default SSC mode selection policy or an SSC mode included in a default SSC mode selection policy rule. If the SSC mode selection policy does not include a default SSC mode selection policy rule and a different rule matched with the application is not present, a UE may request a PDU session without the provision of an SSC mode. In this case, a network may determine the SSC mode of the PDU session.

An SSC mode selection policy rule provided to a UE may be updated by an operator.

An SMF may receive an SSC mode and a list of default SSC modes, supported for each DNN, from UDM as part of subscription information.

If a UE provides an SSC mode at the time of a new PDU session request, the SMF may select an SSC mode by accepting a requested SSC mode and/or a local configuration or modifying the requested SSC mode based on the subscription information.

If a UE does not provide an SSC mode at the time of a new PDU session request, the SMF may apply the local configuration in order to select a default SSC mode for a data network listed within the subscription information or to select the SSC mode.

The SMF may notify the UE of the selected SSC mode for a PDU session.

The UE may determine the SSC mode in response to a request from an application or based on a previously provisioned policy.

If only one SSC mode is supported in one PDU session, when an application requests a different SSC mode, a UE must establish a new PDU session.

That is, when the UE has multiple applications that require different SSC modes, the UE may need to establish a different PDU session according to a required SSC mode. In this case, the UE will have several established PDU sessions.

If the UE has three applications and the applications require the SSC mode 1, the SSC mode 2, and the SSC mode 3, respectively, the UE may need to establish three different PDU sessions although such PDU sessions are connected to the same DN.

For example, applications may require different SSC modes although they use the same Internet access point name (APN)/data network name (DNN). For example, a web browsing application may require the SSC mode 2 because it does not need session continuity. An application supporting a voice of Internet protocol (VoIP) may require the SSC mode 1 or the SSC mode 3 because it requires session continuity. In this case, a UE may need to establish two PDU sessions although the applications use the same Internet APN/DNN.

Accordingly, both a UE and a network perform an operation for managing PDU sessions because the number of established PDU sessions of the UE is increased. As a result, both the UE and the network may have a burden attributable to the increased PDU sessions. In other words, such a mechanism increases the number of PDU sessions for each UE. As a result, a next-generation core network may need to manage more PDU sessions compared to an EPC network.

If application traffic continuously occurs, to establish a new PDU session for a specific SSC mode may be preferred. However, when application traffic occurs in a special situation, to use the existing PDU session that guarantees session and service continuity of the same level may be preferred. For example, when a UE has a PDU session having the SSC mode 3 for a basic Internet connection, the UE may start video streaming service that requires a PDU session having the SSC mode 2. In such a scenario, a new PDU session having the SSC mode 2 may not be necessary because the existing PDU session having the SSC mode 3 can support video traffic.

Accordingly, if the existing PDU session supports a higher level of session and service continuity, a method using the existing PDU session is proposed.

Hereinafter, in the description of the present invention, an IP flow is illustrated, for convenience of description, but the present invention may be applied to other flows, such as non-IP/Ethernet, other than an IP packet in the same manner.

When a UE needs to establish a PDU session supporting a new SSC mode in response to a request from an application, the UE may determine whether the new SSC mode is necessary by checking the SSC mode of the existing established PDU session.

In this case, the UE may check whether the APN/DNN of the existing PDU session is the same as an APN/DNN requested by the application. If the APN/DNNs are different, the UE may request the establishment of the new PDU session from a network.

For example, if a UE has the existing established PDU session supporting the SSC mode 3, when a different application requests the SSC mode 2, if APN/DNNs are the same (i.e., APN/DNN of the existing PDU session and an APN/DNN requested by the application are the same), the UE may transmit the data of the corresponding application using the existing PDU session supporting the SSC mode 3.

If a UE has the existing established PDU session supporting the SSC mode 1, when an application requests the SSC mode 2, the UE may transmit data using the existing PDU session supporting the SSC mode 1 (if the APN/DNN of the existing PDU session and an APN/DNN requested by the application are the same).

However, if a UE has the existing established PDU session supporting the SSC mode 2, when an application requests the SSC mode 3, service continuity is not supported if the UE uses the existing PDU session. The SSC mode 2 supports service continuity only within a specific area, but the SSC mode 3 supports service continuity out of a specific area. Accordingly, if application traffic that requests the SSC mode 3 is transmitted through a PDU session using the SSC mode 2, service continuity cannot be supported.

When a network establishes the PDU session of a UE, it may transmit indication regarding whether the corresponding PDU session can transmit traffic requested by a different SSC mode (i.e., whether the corresponding PDU session can be used to transmit traffic requested by a different mode).

If a network does not allow a corresponding PDU session (i.e., it cannot be used to transmit traffic of an SSC mode different from an SSC mode supported in the corresponding PDU session), a UE needs to transmit data by requesting a PDU session supporting a new SSC mode.

If a UE does not select an SSC mode in response to a request from an application and an SSC mode is determined by a network (e.g., SMF) (e.g., based on a policy previously provisioned in the network), the network may configure whether data can be transmitted through the existing established PDU session without a request for a PDU session supporting a new SSC mode of the UE with respect to a specific application or IP flow.

For example, a network (e.g., SMF) may configure whether a PDU session supporting a different SSC mode can be used through an allowed SSC mode value as below.

In this case, if an allowed SSC mode is not present, a UE must transmit corresponding application traffic or IP flow through a PDU session having (supporting) a required continuity type.

Rule 1, priority 1: application (APP)=com.example.skype, required continuity type=SSC mode 3, allowed SSC mode=SSC mode1

Rule 2, priority 2: application (APP)=com.example.web.server, required continuity type=SSC mode 1, allowed SSC mode=SSC mode 2/3

Rule 3, priority 3: protocol=TCP; destination port (DstPort)=80, required continuity type=SSC mode 2, allowed SSC mode=SSC mode 1/3

Default Rule: default continuity type=SSC mode 2

Figure 12:
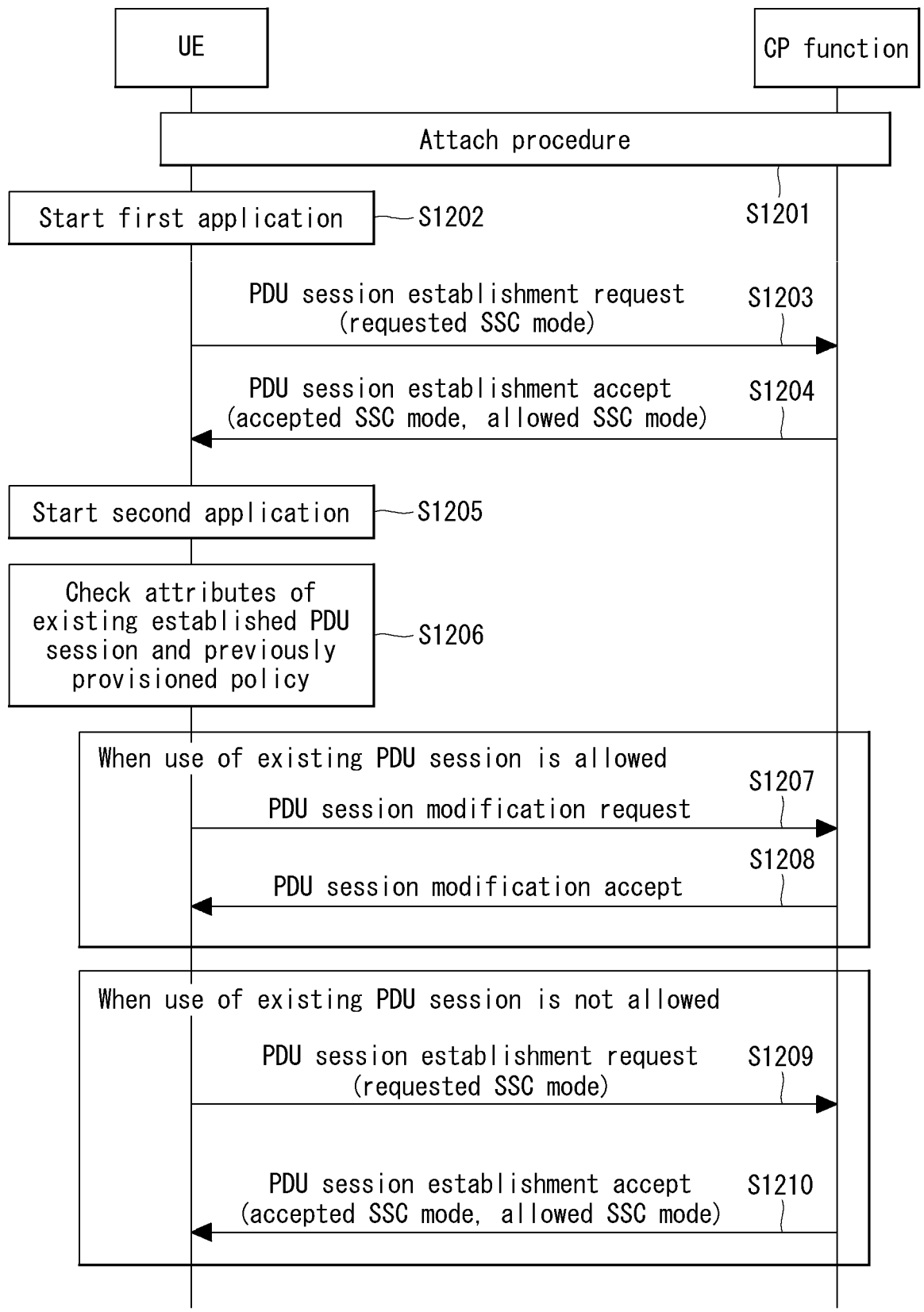
FIG. 12 is a diagram illustrating a session and service continuity selection method according to an embodiment of the present invention.

FIG. 12 is a diagram illustrating a session and service continuity selection method according to an embodiment of the present invention.

In FIG. 12, a CP function means a node responsible for a control plane function within a network. For example, an SMF may correspond to the CP function.

Referring to FIG. 12, a UE and the CP function perform an attach procedure (or registration procedure) (S1201).

While the UE performs the attach (or registration) procedure on the network, a PDU session may be generated or only an attach (or registration) procedure may be performed without the generation of a PDU session.

FIG. 12 illustrates a case where only an attach (or registration) procedure is performed without the generation of a PDU session.

When a first application starts and a PDU session request for a new SSC mode is received from the first application (i.e., when a request for data transmission is received from the first application) (S1202), the UE requests the establishment of a first PDU session by transmitting, to the network (e.g., CP function), a selected SSC mode (i.e., requested SSC mode) through a PDU session establishment request message (S1203).

That is, if the attach (or registration) procedure and the procedure for PDU generation (e.g., PDU session establishment procedure) are separately performed, the UE may request the establishment of the first PDU session by transmitting the selected SSC mode to the network (e.g., CP function) through the PDU session establishment request message.

In contrast, if a PDU session is generated while the attach (or registration) procedure is performed, the UE may request the establishment of the first PDU session by transmitting the selected SSC mode to the network (e.g., CP function) through a desired attach request (or registration request) message.

The network (e.g., CP function) may select an SSC mode for a PDU session generated for the corresponding UE by taking into consideration information (e.g., APN, DNN, slice information) on the session received from the UE, subscriber information and operator configuration owned by the network, a policy rule forwarded to the UE, a network situation, etc. Furthermore, during the attach (or registration) procedure or the PDU session establishment procedure, the UE may be notified of the SSC mode for the first PDU session.

The network (e.g., CP function) transmits, to the UE, an accepted SSC mode and an allowed SSC mode through a PDU session establishment accept message for the first PDU session (S1204).

In contrast, if a PDU session is generated while the Attach (or registration) procedure is performed, the network (e.g., CP function) may transmit an accepted SSC mode and an allowed SSC mode through an attach accept (or registration accept) message.

As described above, the network may also notify the UE of the allowed SSC mode, indicating whether the application that requires a different SSC mode can use the corresponding PDU session.

That is, the allowed SSC mode may indicate an SSC mode supportable by a corresponding PDU session in addition to the SSC mode (i.e., SSC mode, that is, the attributes of the corresponding PDU session) of the PDU session. In this case, the supportable SSC mode may be one or more.

In order for a corresponding PDU session to be not used for a different application, the allowed SSC mode may be set like "allowed SSC mode=not allowed." In contrast, if a corresponding PDU session is allowed with respect to a different application that requires a different SSC mode, the allowed SSC mode may be set as an allowed specific SSC mode. In this case, the allowed SSC mode may include multiple SSC modes.

When a second application starts and a PDU session request for a new SSC mode is received from the second application (when a request for data transmission is received from the second application) (S1205), the UE checks the attributes of the existing established PDU session (i.e., first PDU session) and a previously provisioned policy (i.e., SSC mode selection policy) (S1206).

That is, the UE determines whether to transmit the data of the application or whether to request the establishment of a new PDU session (i.e., second PDU session) using the existing PDU session (i.e., first PDU session) based on a policy rule (i.e., SSC mode selection rule) received from the network.

In other words, when the application requests data transmission (e.g., network socket open), if the UE already has an activated PDU session matched with an SSC mode associated with the application, the UE routes (i.e., transmits) the data of the corresponding application within the PDU session. If not, the UE requests the establishment of a new PDU session having an SSC mode matched with an SSC mode associated with the application.

1) When the use of the existing PDU session (i.e., first PDU session) is allowed If it is determined to transmit the data of the second application through the existing PDU session (i.e., first PDU session), the UE may transmit, to the network (e.g., CP function), a PDU session modification message for changing the QoS of the existing PDU session (i.e., first PDU session) in order to transmit a new IP flow (S1207).

The PDU session modification message may include information on the new IP flow (i.e., data of the second application) and requested QoS information.

In this case, the network (e.g., CP function) may determine whether to allow the new IP flow to be transmitted through the existing established PDU session (i.e., first PDU session).

If the new IP flow is allowed to be transmitted through the existing established PDU session (i.e., first PDU session) and a change in the QoS requested by the UE is accepted, the network (e.g., CP function) may transmit a PDU session modification accept message to the UE (S1208).

In contrast, if the new IP flow is not allowed to be transmitted through the existing established PDU session (i.e., first PDU session), the network (e.g., CP function) may notify the UE that the corresponding PDU session (i.e., first PDU session) cannot be used to transmit the new IP flow by transmitting a PDU session modification reject message to the UE.

In this case, a cause value of the PDU session modification reject message may be set as a value, such as "IP flow is not allowed."

When the UE receives the above PDU session modification reject message from the network (e.g., CP function), it may request the establishment of a PDU session (i.e., second PDU session), having a new SSC mode, from the network.

2) When the use of the existing PDU session is not allowed

If it is determined to transmit the data of a new application through a new PDU session (i.e., second PDU session), the UE requests the establishment of the new PDU session (i.e., second PDU session), having an SSC mode matched with an SSC mode associated with the new application, by transmitting a PDU session establishment request message (S1209).

The PDU session establishment request message may include a requested SSC mode for the new PDU session (i.e., second PDU session).

The network (e.g., CP function) may select an SSC mode for the PDU session (i.e., second PDU session) generated for the corresponding UE by taking into consideration information (e.g., APN, DNN, slice information) on a session received from the UE, subscriber information and an operator configuration owned by the network, a policy rule forwarded to the UE, a network situation, etc.

Furthermore, the network (e.g., CP function) transmits, to the UE, an accepted SSC mode and an allowed SSC mode through a PDU session establishment accept message for the second PDU session (S1210).

Meanwhile, at step S1206, if the UE does not have a rule (i.e., SSC mode selection policy) received from the network, it may transmit the data of a new application (i.e., second application) using a higher session and a PDU session supporting service continuity as follows.

For example, the SSC mode 1 supports session and service continuity of the highest level, and next mode may be the SSC mode 3, and the last mode may be the SSC mode 2 of the lowest level.

Accordingly, this may be expressed as follows. In this case, the APN/DNN of the existing PDU session (i.e., first PDU session) needs to be the same as the APN/DNN of a newly requested PDU session (i.e., second PDU session) by checking the APN/DNN of the existing PDU session.

When an SSC mode 1 PDU session is present->SSC mode 1/SSC mode 2/SSC mode 3 IP flow is supportable When an SSC mode 2 PDU session is present->only SSC mode 2 is possible and a different SSC mode is unavailable When an SSC mode 3 PDU session is present->SSC mode 2/SSC mode 3 IP flow is supportable Furthermore, if the application does not indicate a specific SSC mode, a default SSC mode may be used. In this case, whether the data transmission of the new application (i.e., second application) is possible through the existing PDU session (i.e., first PDU session) may be checked by checking the SSC mode of the existing PDU session (i.e., first PDU session) in the same manner.

Alternatively, when a PDU session is requested as the existing SSC mode (i.e., application does not indicate a specific SSC mode), the UE may always transmit the data of the new application (i.e., second application) using the existing PDU session (i.e., first PDU session).

Meanwhile, the UE may request several PDU sessions at the same time in parallel. In this case, if a request for the establishment of PDU sessions having different SSC modes with the same data network (DN) is necessary, the UE may first request the establishment of a PDU session for an SSC mode supporting a higher level of session and service continuity.

Alternatively, if the UE generates a PDU session for an SSC mode supporting a higher level of session and service continuity, the UE may postpone a request for a PDU session for an application associated with an SSC mode supporting a low level of session and service continuity (although a request for data transmission is received from an application associated with an SSC mode supporting a low level of session and service continuity), and may wait for the establishment of a PDU session supporting an SSC mode supporting a higher level of session and service continuity. Thereafter, the UE may determine whether the data of the application associated with the SSC mode supporting a low level of session and service continuity can be transmitted using a PDU session having an SSC mode supporting a higher level of session and service continuity. The UE may request the establishment of a new PDU session from the network for the data transmission of the application associated with the SSC mode supporting a low level of session and service continuity based on a result of the determination or may transmit the data of the corresponding application using the existing PDU session.

A method for the UE to determine whether to use the existing activated PDU session or to request the establishment of a new PDU session from the network when a request for the data transmission of an application is received at step S1206 of FIG. 12 is described more specifically.

When the UE requests a PDU session, the UE may indicate a requested SSC mode by including the requested SSC mode as part of PDU session setup signaling.

A serving network receives a list of SSC modes and default SSC modes supported for each data network per subscriber as part of subscription information from a subscription database.

The serving network selects an SSC mode by accepting an SSC mode requested by the UE or modifying the requested SSC mode based on subscription and/or a local configuration.

When the UE requests a new PDU session, if it does not provide an SSC mode, the network selects a listed default SSC mode within the subscription information or applies a local configuration for selecting an SSC mode.

After selecting the SSC mode, the network (a) may accept a PDU session request from the UE or indicate the selected SSC mode with respect to the UE or (b) may reject the PDU session request and transmit, to the UE, the selected SSC mode and a cause value indicating that the selected SSC mode is already used by a different PDU session within the UE.

The SSC mode may be applied to each PDU session. The UE may request a different SSC mode for a different PDU session. That is, different PDU sessions that have been activated in parallel may have different SSC modes for the same UE.

The UE checks whether the existing PDU session may be used for an application before it requests a PDU session having a specific SSC mode based on a corresponding application request. If the existing PDU session satisfies session and service continuity requirements, the UE does not request the establishment of a PDU session having a new SSC mode.

Table 1 shows whether the existing PDU session is allowed to transmit traffic having a different SSC mode when an application requests a new PDU session.

TABLE 1

| Existing PDU session | Request SSC mode | | |
| --- | --- | --- | --- |
| | SSC mode 1 | SSC mode 2 | SSC mode 3 |
| (PDU session with SSC mode 1 | Allowed | Allowed | Allowed |
| PDU session with SSC mode 2 | Not allowed | Allowed | Not allowed |
| PDU session with SSC mode 3 | Not allowed | Allowed | Allowed |

Referring to Table 1, if the existing PDU session with the SSC mode 1 has been activated, a UE may use the existing PDU session for the data transmission of a new application that requires the SSC mode 1, the SSC mode 2 or the SSC mode 3. That is, the UE may not request the establishment of a new PDU session from a network.

Furthermore, if the existing PDU session with the SSC mode 2 has been activated, a UE may use the existing PDU session for the data transmission of a new application that requires the SSC mode 2. That is, the UE may not request the establishment of a new PDU session from a network. In contrast, the UE needs to request the establishment of a new PDU session from the network for the data transmission of a new application that requires the SSC mode 1 or the SSC mode 3.

Furthermore, if the existing PDU session with the SSC mode 3 has been activated, a UE may use the existing PDU session for the data transmission of a new application that requires the SSC mode 2 or the SSC mode 3. That is, the UE may not request the establishment of a new PDU session from a network. In contrast, the UE needs to request the establishment of a new PDU session from the network for the data transmission of a new application that requires the SSC mode 1.

An SSC mode is not changed during the lifetime of a PDU session.

TUPF (or UPF) selection: when a TUPF for a PDU session is selected, a network takes into consideration the current attach point of a UE and a requested SSC mode.

Figure 13:
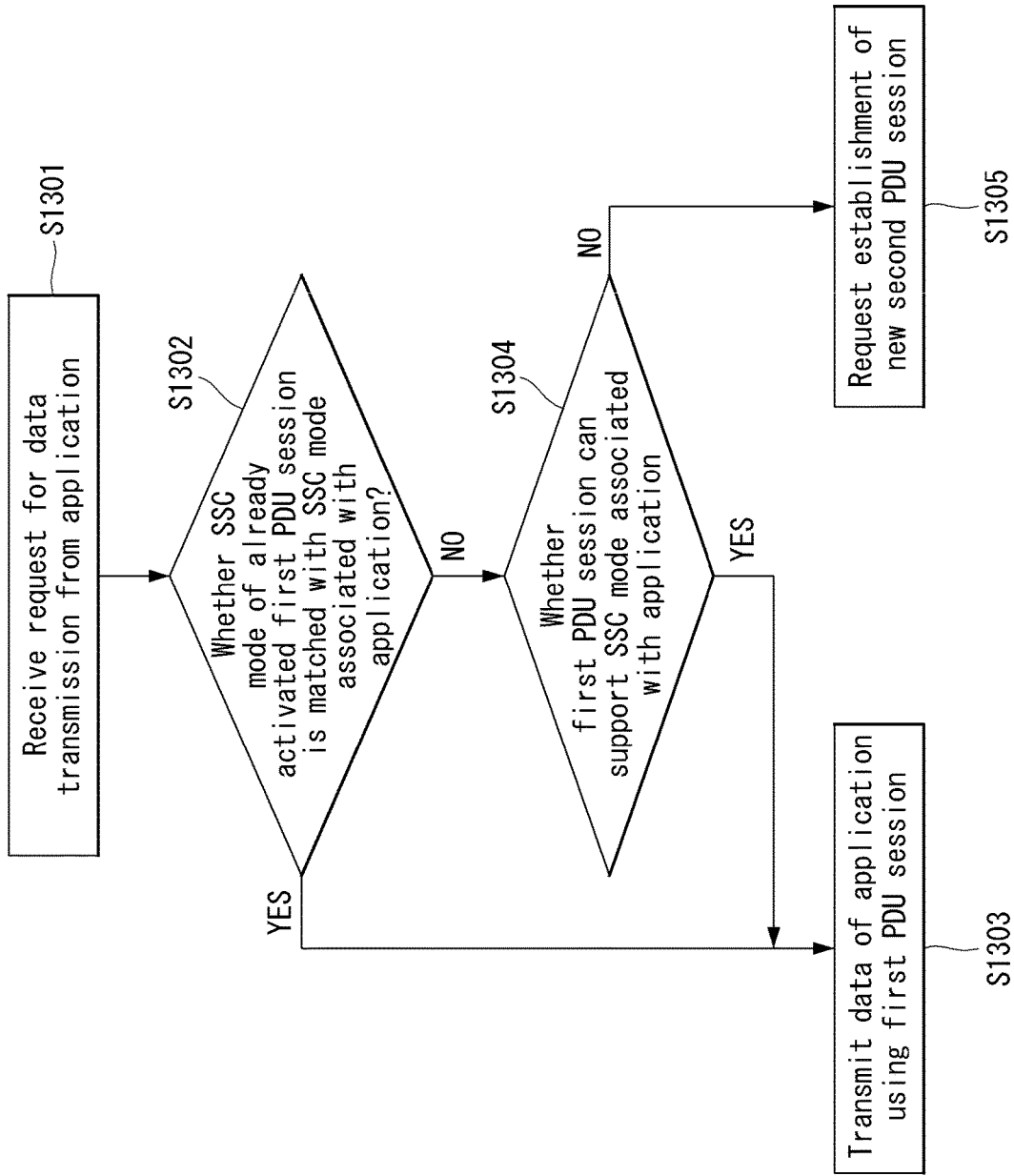
FIG. 13 is a diagram illustrating a session and service continuity selection method according to an embodiment of the present invention.

FIG. 13 is a diagram illustrating a session and service continuity selection method according to an embodiment of the present invention.

Referring to FIG. 13, a UE receives a request for data transmission from an application (i.e., application being driven within the UE) (S1301).

In this case, when the request for data transmission is received from the application, a required SSC mode may also be indicated by the application.

Alternatively, when the request for data transmission is received from the application, a required SSC mode may not be indicated by the application. In this case, the UE may determine an SSC mode associated with the application based on a policy provided by a network.

The UE checks whether the SSC mode of an already activated first PDU session is matched (identical) with the already activated SSC mode associated with the application (S1302).

As described above, the SSC mode may include the SSC mode 1, the SSC mode 2, and the SSC mode 3. In the case of the PDU session of the SSC mode 1, a PDU session anchor used when the PDU session is established may be maintained regardless of an access technology being used by a UE in order to access a network. In the case of the PDU session of the SSC mode 2, to maintain a PDU session anchor used when the PDU session is established may not be guaranteed. In the case of the PDU session of the SSC mode 3, the establishment of UE connectivity may be allowed through a new PDU session anchor toward the same data network before a connection between a UE and a previous PDU session anchor is released.

If, as a result of the determination at step S1302, the SSC mode of the first PDU session is matched with the SSC mode associated with the application, the UE transmits the data of the application to a network using the first PDU session without requesting the network to establish a new second PDU session (S1303).

In contrast, if, as a result of the determination at step S1302, the SSC mode of the first PDU session is not matched with the SSC mode associated with the application, the UE checks whether the first PDU session can support the SSC mode associated with the application (S1304).

When the first PDU session is established, the UE may receive an accepted SSC mode and an allowed SSC mode from the network with respect to the first PDU session.

This is described specifically. The network (e.g., CP function or SMF) receives a PDU session establishment request message, including an SSC mode requested by the UE with respect to a PDU session. The network selects an SSC mode for a PDU session by accepting the requested SSC mode or modifying the requested SSC mode based on subscription information and/or a local configuration. The network may transmit, to the UE, a PDU session establishment accept message, including the selected SSC mode and an allowed SSC mode indicating an SSC mode that may be supported by the PDU session in addition to the selected SSC mode.

In this case, the network may check whether the first PDU session can support the SSC mode associated with the application by checking whether the SSC mode associated with the application is included in the allowed SSC mode. That is, if the SSC mode associated with the application is included in the allowed SSC mode, the network may determine that the first PDU session can support the SSC mode associated with the application.

Alternatively, the UE may check whether the first PDU session can support the SSC mode associated with the application based on a policy provided by a network.

Alternatively, the UE may check whether the first PDU session can support the SSC mode associated with the application by checking whether the SSC mode of the first PDU session supports higher session and service continuity than that of the SSC mode associated with the application.

For example, if the SSC mode of the first PDU session is the SSC mode 1, the first PDU session may support all cases where the SSC mode associated with the application is the SSC mode 1, the SSC mode 2 or the SSC mode 3. Furthermore, if the SSC mode of the first PDU session is the SSC mode 2, the first PDU session may support only a case where the SSC mode associated with the application is the SSC mode 2. Furthermore, if the SSC mode of the first PDU session is the SSC mode 3, the first PDU session may support a case where the SSC mode associated with the application is the SSC mode 2 or the SSC mode 3.

If, as a result of the determination at step S1304, the first PDU session can support the SSC mode associated with the application, the UE transmits the data of the application to a network using the first PDU session without a request for the establishment of a new second PDU session (S1303).

That is, if the first PDU session can support the SSC mode associated with the application, although the SSC mode of the first PDU session is not identical (i.e., matched) with the SSC mode associated with the application, the UE may transmit the data of the application to the network using the first PDU session without requesting the network to establish a new second PDU session.

In contrast, if, as a result of the determination at step S1304, the first PDU session does not support the SSC mode associated with the application, the UE requests the establishment of a new second PDU session from the network (S1305).

FIG. 13 illustrates a method of determining whether the SSC mode of the first PDU session is matched with the SSC mode associated with the application (S1302) and determining whether the first PDU session can support the SSC mode associated with the application (S1304), but this is for convenience of description and the present invention is not limited thereto. That is, step S1302 may be omitted. In this case, when a request for data transmission is received from an application (S1301), the UE may check whether a first PDU session can support an SSC mode associated with the application (S1304).

That is, if the SSC mode of the first PDU session is matched (identical) with the SSC mode associated with the application, it may be determined that the first PDU session can support the SSC mode associated with the application. Accordingly, step S1302 may be omitted.

Accordingly, if the first PDU session can support the SSC mode associated with the application, although the SSC mode of the first PDU session is not identical (i.e., matched) with the SSC mode associated with the application, the UE may transmit the data of the application to the network using the first PDU session without requesting the network to establish a new second PDU session (S1303).

In contrast, if, as a result of the determination at step S1304, the first PDU session does not support the SSC mode associated with the application, the UE may request the establishment of a new second PDU session from the network (S1305).

General Apparatus to Which the Present Invention may be Applied

Figure 14:
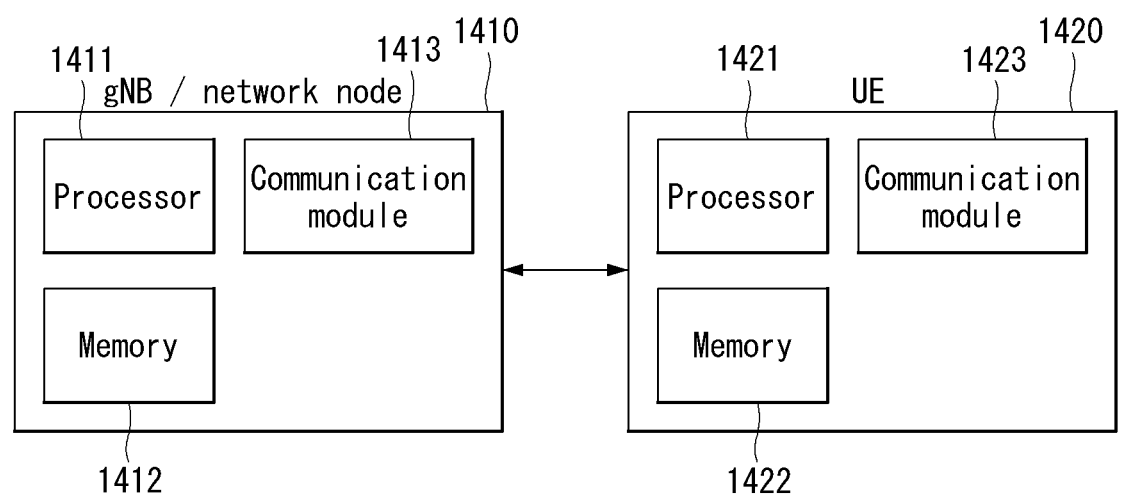
FIG. 14 illustrates a block diagram of a communication apparatus according to an embodiment of the present invention.

FIG. 14 illustrates a block diagram of a communication apparatus according to an embodiment of the present invention.

Referring to FIG. 14, a wireless communication system includes a network node 1410 and multiple UEs 1420.

The network node 1410 includes a processor 1411, memory 1412, and a communication module 1413. The processor 1411 implements the functions, processes and/or methods proposed in FIGS. 1 to 13. The layers of a wired/wireless interface protocol may be implemented by the processor 1411. The memory 1412 is connected to the processor 1411 and stores various pieces of information for driving the processor 1411. The communication module 1413 is connected to the processor 1411 and transmits and/or receives a wired/wireless signal. A network entity (e.g., AMF, SMF, (R)AN, UPF, PCF) illustrated in FIG. 1, for example, may correspond to the network node 1410. Particularly, if the network node 1410 is a base station, the communication module 1413 may include a radio frequency (RF) unit for transmitting/receiving radio signals.

The UE 1420 includes a processor 1421, memory 1422, and a communication module (or RF unit) 1423. The processor 1421 implements the functions, processes and/or methods proposed in FIGS. 1 to 13. The layers of a radio interface protocol may be implemented by the processor 1421. The memory 1422 is connected to the processor 1421 and stores various pieces of information for driving the processor 1421. The communication module 1423 is connected to the processor 1421 and transmits and/or receives a radio signal.

The memory 1412, 1422 may be positioned inside or outside the processor 1411, 1421 and may be connected to the processor 1411, 1421 by various well-known means. Furthermore, the network node 1410 (if it is a base station) and/or the UE 1420 may have a single antenna or multiple antennas.

Figure 15:
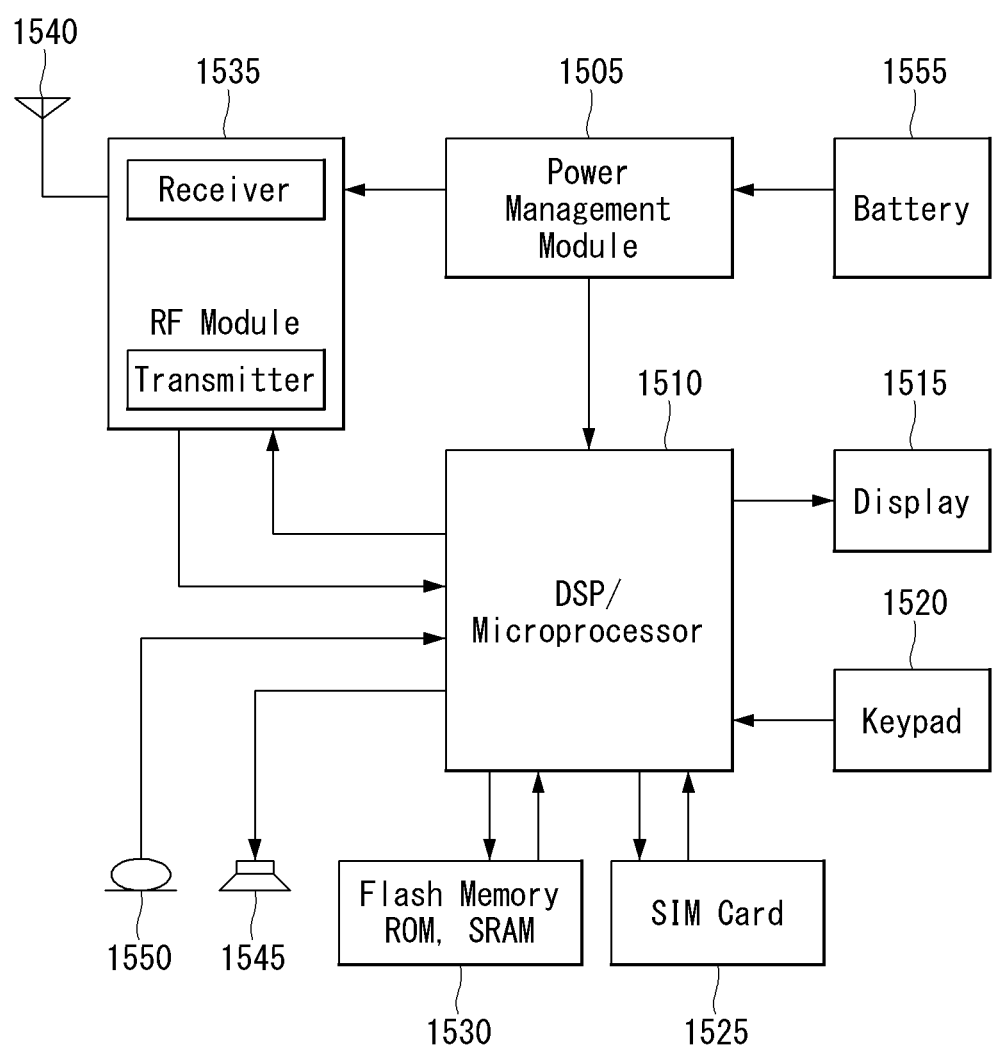
FIG. 15 illustrates a block diagram of a communication apparatus according to an embodiment of the present invention.

FIG. 15 illustrates a block diagram of a communication apparatus according to an embodiment of the present invention.

Specifically, FIG. 15 is a diagram illustrating the UE of FIG. 14 more specifically.

Referring to FIG. 15, the UE may include a processor (or digital signal processor (DSP)) 1510, an RF module (or RF unit) 1535, a power management module 1505, an antenna 1540, a battery 1555, a display 1515, a keypad 1520, a memory 1530, a subscriber identification module (SIM) card 1525 (this element is optional), a speaker 1545, and a microphone 1550. The UE may further include a single antenna or multiple antennas.

The processor 1510 implements the function, process and/or method proposed in FIGS. 1 to 13. The layers of a radio interface protocol may be implemented by the processor 1510.

The memory 1530 is connected to the processor 1510, and stores information related to the operation of the processor 1510. The memory 1530 may be positioned inside or outside the processor 1510 and may be connected to the processor 1510 by various well-known means.

A user inputs command information, such as a telephone number, by pressing (or touching) a button of the keypad 1520 or through voice activation using the microphone 1550, for example. The processor 1510 receives such command information and performs processing so that a proper function, such as making a phone call to the telephone number, is performed. Operational data may be extracted from the SIM card 1525 or the memory 1530. Furthermore, the processor 1510 may recognize and display command information or driving information on the display 1515, for convenience sake.

The RF module 1535 is connected to the processor 1510 and transmits and/or receives RF signals. The processor 1510 delivers command information to the RF module 1535 so that the RF module 1535 transmits a radio signal that forms voice communication data, for example, in order to initiate communication. The RF module 1535 includes a receiver and a transmitter in order to receive and transmit radio signals. The antenna 1540 functions to transmit and receive radio signals. When a radio signal is received, the RF module 1535 delivers the radio signal so that it is processed by the processor 1510, and may convert the signal into a baseband. The processed signal may be converted into audible or readable information output through the speaker 1545.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applied to a 3GPP LTE/LTE-A and 5G systems is primarily described, but can be applied to various wireless communication systems in addition to the 3GPP LTE/LTE-A and 5G systems.

What is claimed is:

1. A method of selecting a session and service continuity (SSC) mode, associated with a protocol data unit (PDU) session, by a user equipment (UE) in a wireless communication system supporting a plurality of SSC modes, the method comprising:
    receiving, from an application, a request for data transmission;
    checking whether a first PDU session is capable of supporting the SSC mode associated with the application, based on that an SSC mode of the first PDU session is not identical with the SSC mode associated with the application; and
    transmitting data of the application to a network using a specific PDU session,
    wherein (i) based on the first PDU session being capable of supporting the SSC mode associated with the application, the specific PDU session is the first PDU session, and (ii) when the first PDU session not being capable of supporting the SSC mode associated with the application, the specific PDU session is a second PDU session,
    wherein the first PDU session is an existing PDU session which is pre-established, and wherein the second PDU session is a new PDU session which is newly established after the establishment of the first PDU session,
    wherein whether the first PDU session is capable of supporting the SSC mode associated with the application is determined based on a specific policy rule which is pre-configured, and
    wherein the specific policy rule is configured to define whether a PDU session related to a specific SSC mode of the plurality of SSC modes supports an SSC mode other than the specific SSC mode, among the plurality of SSC modes.

2. The method of claim 1,
    wherein the plurality of SSC modes comprises an SSC mode 1, an SSC mode 2 and an SSC mode 3,
    wherein in a PDU session of the SSC mode 1, a PDU session anchor, which is used when a PDU session is established, is maintained regardless of an access technology that is being used for the UE to access the network,
    wherein in a PDU session of the SSC mode 2, maintaining a PDU session anchor, which is used when a PDU session is established, is not guaranteed, and
    wherein in a PDU session of the SSC mode 3, an establishment of UE connectivity through a new PDU session anchor to an identical data network before a connection between the UE and a previous PDU session anchor is allowed.

3. The method of claim 2, further comprising:
    receiving an accepted SSC mode and allowed SSC mode for the first PDU session from the network when the first PDU session is established.

4. The method of claim 3,
    wherein the checking step comprises checking whether the SSC mode associated with the application is included in the allowed SSC mode.

5. The method of claim 2,
    wherein the checking step comprises checking whether the SSC mode of the first PDU session supports a higher session and service continuity than the SSC mode associated with the application.

6. The method of claim 5,
    wherein when the SSC mode of the first PDU session is the SSC mode 1, the first PDU session supports all cases where the SSC mode associated with the application is the SSC mode 1, the SSC mode 2 or the SSC mode 3.

7. The method of claim 5,
    wherein when the SSC mode of the first PDU session is the SSC mode 2, the first PDU session supports only a case where the SSC mode associated with the application is the SSC mode 2.

8. The method of claim 5,
    wherein when the SSC mode of the first PDU session is the SSC mode 3, the first PDU session supports a case where the SSC mode associated with the application is the SSC mode 2 or the SSC mode 3.

9. The method of claim 1,
    wherein when the request for data transmission is received from the application, an SSC mode requested by the application is indicated together.

10. The method of claim 1, further comprising:
    determining an SSC mode, associated with the application, based on a policy provided by the network if an SSC mode requested by the application is not indicated when the request for data transmission is received from the application.

11. A user equipment (UE) configured to select a session and service continuity (SSC) mode, associated with a protocol data unit (PDU) session in a wireless communication system supporting a plurality of SSC modes, the UE comprising:
    a communication module configured to transmit and receive a signal; and
    a processor configured to control the communication module,
    wherein the processor is configured to:
    receive, from an application, a request for data transmission;
    check whether a first PDU session is capable of supporting the SSC mode associated with the application, based on that an SSC mode of the first PDU session is not identical with the SSC mode associated with the application; and
    transmitting transmit data of the application to a network using a specific PDU session,
    wherein (i) based on the first PDU session being capable of supporting the SSC mode associated with the application, the specific PDU session is the first PDU session, and (ii) when the first PDU session not being capable of supporting the SSC mode associated with the application, the specific PDU session is a second PDU session,
    wherein the first PDU session is an existing PDU session which is pre-established and the second PDU session is a new PDU session which is newly established after the establishment of the first PDU session, wherein whether the first PDU session is capable of supporting the SSC mode associated with the application is determined based on a specific policy rule which is pre-configured, and wherein the specific policy rule is configured to define whether a PDU session related to a specific SSC mode of the plurality of SSC modes supports an SSC mode other than the specific SSC mode, among the plurality of SSC modes.

* * * * *